INVENTORS.
Clifford Goldmeyer
BY Thomas J. Neill.
Wood, Herron & Evans.
ATTORNEYS.

INVENTORS.
Clifford Goldmeyer
BY Thomas J. Wells
Wood, Herron & Evans
ATTORNEYS.

May 2, 1967 C. GOLDMEYER ET AL 3,316,944

HELICAL WRAPPING MECHANISM FOR COIL SPRING UNITS

Filed Jan. 23, 1964

17 Sheets-Sheet 3

INVENTORS.
Clifford Goldmeyer
BY Thomas J. Hull.
Wood, Herron & Evans.
ATTORNEYS.

INVENTORS.
Clifford Goldmeyer
BY Thomas J. Dull
Wood, Herron & Evans
ATTORNEYS.

May 2, 1967 C. GOLDMEYER ETAL 3,316,944

HELICAL WRAPPING MECHANISM FOR COIL SPRING UNITS

Filed Jan. 23, 1964 17 Sheets-Sheet 5

INVENTORS.
Clifford Goldmeyer
BY Thomas J. Hull.
Wood, Herron & Evans.
ATTORNEYS.

INVENTORS.
Clifford Goldmeyer.
BY Thomas J. Luell.
Wood, Herron & Evans
ATTORNEYS.

HELICAL WRAPPING MECHANISM FOR COIL SPRING UNITS

Filed Jan. 23, 1964

INVENTORS.
Clifford Goldmeyer,
BY Thomas J. Niell.
Wood, Herron & Evans.
ATTORNEYS.

INVENTORS.
Clifford Goldmeyer
BY Thomas J. Dill.
Wood, Herron & Evans.
ATTORNEYS.

May 2, 1967 C. GOLDMEYER ETAL 3,316,944

HELICAL WRAPPING MECHANISM FOR COIL SPRING UNITS

Filed Jan. 23, 1964 17 Sheets-Sheet

INVENTORS.
Clifford Goldmeyer.
BY Thomas J. Lull.
Wood, Herron & Evans.
ATTORNEYS.

HELICAL WRAPPING MECHANISM FOR COIL SPRING UNITS

Filed Jan. 23, 1964

17 Sheets-Sheet 10

INVENTORS.
Clifford Goldmeyer,
BY Thomas J. Dell.
Wood, Herron & Evans.
ATTORNEYS.

INVENTORS.
Clifford Goldmeyer
BY Thomas J. Lillell.
Wood, Herron & Evans.
ATTORNEYS.

INVENTORS.
Clifford Goldmeyer.
BY Thomas J. Diell.
Wood, Herron & Evans.
ATTORNEYS.

HELICAL WRAPPING MECHANISM FOR COIL SPRING UNITS

Filed Jan. 23, 1964

INVENTORS.
Clifford Goldmeyer
BY Thomas J. Wull.
Wood, Herron & Evans.
ATTORNEYS.

INVENTORS.
Clifford Goldmeyer
BY Thomas J. Neill.
Wood, Herron & Evans.
ATTORNEYS.

INVENTORS.
Clifford Goldmeyer.
BY Thomas J. Dill.
Wood, Herron & Evans.
ATTORNEYS.

INVENTORS.
Clifford Goldmeyer,
BY Thomas J. Hill.
Wood, Herron & Evans.
ATTORNEYS.

INVENTORS.
Clifford Goldmeyer
BY Thomas J. Hull
Wood, Herron & Evans
ATTORNEYS.

United States Patent Office 3,316,944

Patented May 2, 1967

3,316,944

HELICAL WRAPPING MECHANISM FOR COIL SPRING UNITS

Clifford Goldmeyer, Cincinnati, and Thomas J. Dull, Fairfield, Ohio, assignors to The J. R. Greeno Company, Cincinnati, Ohio, a corporation of Ohio Filed Jan. 23, 1964, Ser. No. 339,638
18 Claims. (Cl. 140—92.3)

This invention relates to a machine utilized in the final assembly of coil spring units of the type used for mattresses, bed springs and the like. Spring units of this character comprise rows of coil springs joined together at the top and bottom by helical wires which are threaded in corkscrew fashion about the adjacent portions of the terminals of the coil springs.

One of the primary objectives of the invention has been to provide a machine which is adapted to utilize the end portions of the helicals to connect the terminals of the marginal row of coil springs to the upper and lower border wires which delineate the size and shape of the spring unit. In carrying out the invention, the present machine, generally speaking, trims the end portion of each helical, stretches the trimmed end portion of the helical, then wraps the end portion of the helical about the adjoining portions of the terminal and border wire to provide a connection therebetween.

In the primary fabrication of spring units of the present type, the coil springs and the helicals are prefabricated. The assembly operation (before the spring unit is placed in the present wrapping machine) consists of positioning the coil springs in adjoining rows and of rotating and threading the helicals upon the mating portions of the terminals of the coil springs at the top and bottom of the spring unit. The coil springs are generally of hour glass shape, as viewed from the side, with enlarged terminals at opposite ends. The terminals comprise closed circular loops which collectively delineate the top and bottom surface of the spring assembly.

A machine for carrying out this primary portion of the assembly procedure is disclosed in the prior Patent 3,045,714, issued to John R. Greeno and Thomas J. Dull (one of the joint inventors of the present machine) on July 24, 1962. In general, the spring assembly disclosed in the patent is provided with upper and lower spring guides which are reciprocated relative to one another to engage and position the mating portions of the top and bottom terminals relative to one another, combined with upper and lower helical feeders which are arranged to rotate and thread the prefabricated helicals upon the mating portions of the upper and lower terminals.

In operating this machine, individual coil springs are placed manually in row formation in the machine in position to be engaged by the upper and lower spring guides. After the individual coil springs are inserted, the upper and lower spring guides are shifted toward one another to compress the coil springs, with the mating portions of the terminals in registry with one another. Thereafter, the helical feeders are activated to thread the helicals upon the mating portions of the upper and lower terminals so as to tie the terminals of the free row of coil springs to a previously assembled row. At completion, the end portions of the helicals project outwardly beyond the opposite sides of the spring unit. This operation is carried out row by row until the spring unit is built up to the required size. Thereafter a border wire, which surrounds the spring unit at the top and bottom and delineates its size and shape, is attached to the marginal portions of the terminals at top and bottom.

According to conventional practice, as carried out in the past, the border wire at top and bottom has been secured to the adjoining terminals by means of clips, tie wires or other devices which are applied after the spring unit is assembled. In order to prevent the helicals from unscrewing from the spring unit after prolonged use, the opposite end portions of the helicals, in the past, have been deformed to prevent rotation. A machine for performing this operation is disclosed in Patent 3,090,407 issued to John R. Greeno et al., to which attention is invited.

According to the primary objective of the present invention, as noted above, the projecting end portions of the helicals at opposite sides of the spring unit are utilized to tie the marginal terminal coils securely to the border wires, thereby eliminating the needs for separate clips, tie wires or the like formerly utilized for this purpose. The present machine thereby brings about a substantial savings in manufacturing costs and also in material. In addition, the end portions of the helicals, when wrapped about the terminals and border wires, also anchor the helicals against axial displacement, thus eliminating the former practice of forming loops or otherwise deforming the ends of the helicals to lock them in place.

In utilizing the wrapping machine of this invention, the spring unit, after having been initially assembled by threading on the helicals, is transferred from the spring assembly machine to the wrapping machine, with the end portions of the helicals projecting outwardly beyond the marginal terminals at opposite sides. Upon being transferred to the wrapping machine, the border wire, helical, and the marginal terminal are located and clamped in registry, then the wrapping machine engages the projecting end portion of each helical and wraps it about the adjoining portions of the terminal and border wire. Each helical is wrapped successively in this manner, the spring unit being advanced in stepwise fashion to bring the individual helicals and adjoining portions of the spring unit into registry with the wrapping mechanism.

Another objective of the present invention has been to provide a wrapping machine which winds a predetermined number of turns of the helical about the border wire and marginal terminal, with the end portion of the wrapped helical located within the confines of the spring unit to avoid damage to the fabric cover which subsequently is applied over the spring unit.

According to this aspect of the invention, a trimming or cut-off mechanism trims the projecting end portion of each helical to a predetermined length (as previously mentioned) prior to the wrapping operation, such that when the trimmed end portion subsequently is wrapped about the border wire, the trimmed end resides within the confines of the spring unit by virtue of its controlled length.

In order to uniformly tie each helical, the wrapping machine is provided with a locating mechanism which locates and clamps the adjoining terminals, border wire, and helical during the cut-off operation and also during the subsequent operations, as described below. In order to simplify the machine, the locating mechanism forms a part of the cut-off mechanism, such that the locating mechanism locates and clamps the terminals, border wire, and helical as an incident to the cut-off or trimming operation. The double function of the cut-off mechanism in its locating and trimming operations constitutes a further aspect of the present invention.

After the projecting end portion of the terminal has been trimmed and clamped in its located position, a stretching mechanism engages the trimmed end portion of the helical, stretches it lengthwise, and shifts it laterally to a position to be engaged by a rotatable wrapping gear. The wrapping gear winds or wraps the end portion of the helical tightly about the border wire and helical portion at a point displaced laterally from the main portion of the helical by virtue of the stretching operation. The stretching mechanism also confines the end portion of the helical within a recess formed in the wrapping gear during the wrapping operation. Accordingly, the stretching mechanism also performs the double function of stretching the helical end portion and of confining it in the wrapping gear during the wrapping operation.

A further objective of the invention has been to provide a simplified operating mechanism for activating the locating and cut-off mechanism, the stretching mechanism, and the wrapping gear in a predetermined positive sequence upon initiation of an operating cycle.

According to this aspect of the invention, a power device (in the present example of an air cylinder) is connected to the locating and cut-off mechanism for actuation thereof. A second power device (also an air cylinder) is connected to the stretching mechanism for actuating it. In addition, rotary motion is imparted to the wrapping gear by a driving system which includes a Geneva motion for rotating the wrapping gear after a time delay.

When the operator initiates the cycle, with the spring unit and helical properly located, the air cylinder for the cut-off and locating mechanism is first actuated to trim and clamp the helical and adjoining terminals, the air cylinder of the stretching mechanism is then activated to engage and stretch the trimmed portion of the helical, finally, rotary motion is imparted to the wrapping gear, causing it to wind the trimmed helical portion about the adjoining portions of the terminal and border wire. At completion of the wrapping operation, the locating and cut-off mechanism as a unit is retracted to a starting position, the stretching mechanism is retracted, and the wrapping gear is stopped in a receiving position ready for the next cycle of operation.

The various features and advantages of the present invention are more clearly apparent to one skilled in the art from the following detailed description taken in conjunction with the drawings.

*Spring unit and general arrangement of the wrapping machine*

Figure 1:
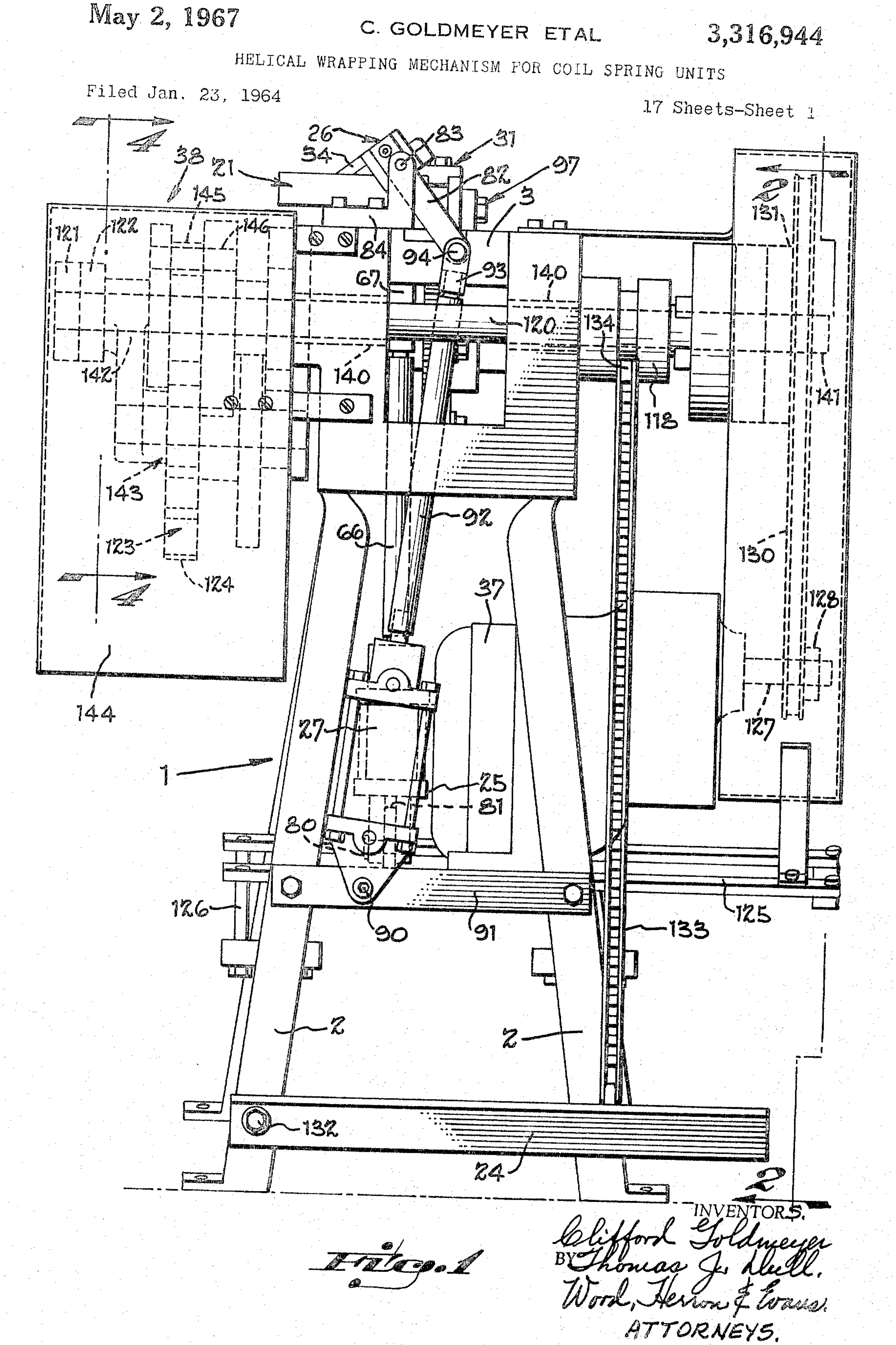
FIGURE 1 is a general front elevation of the helical wrapping machine of this invention, which severs or trims the helical wire, then winds or wraps the end portion of the helical about the terminal coil and border wire.
Figure 2:
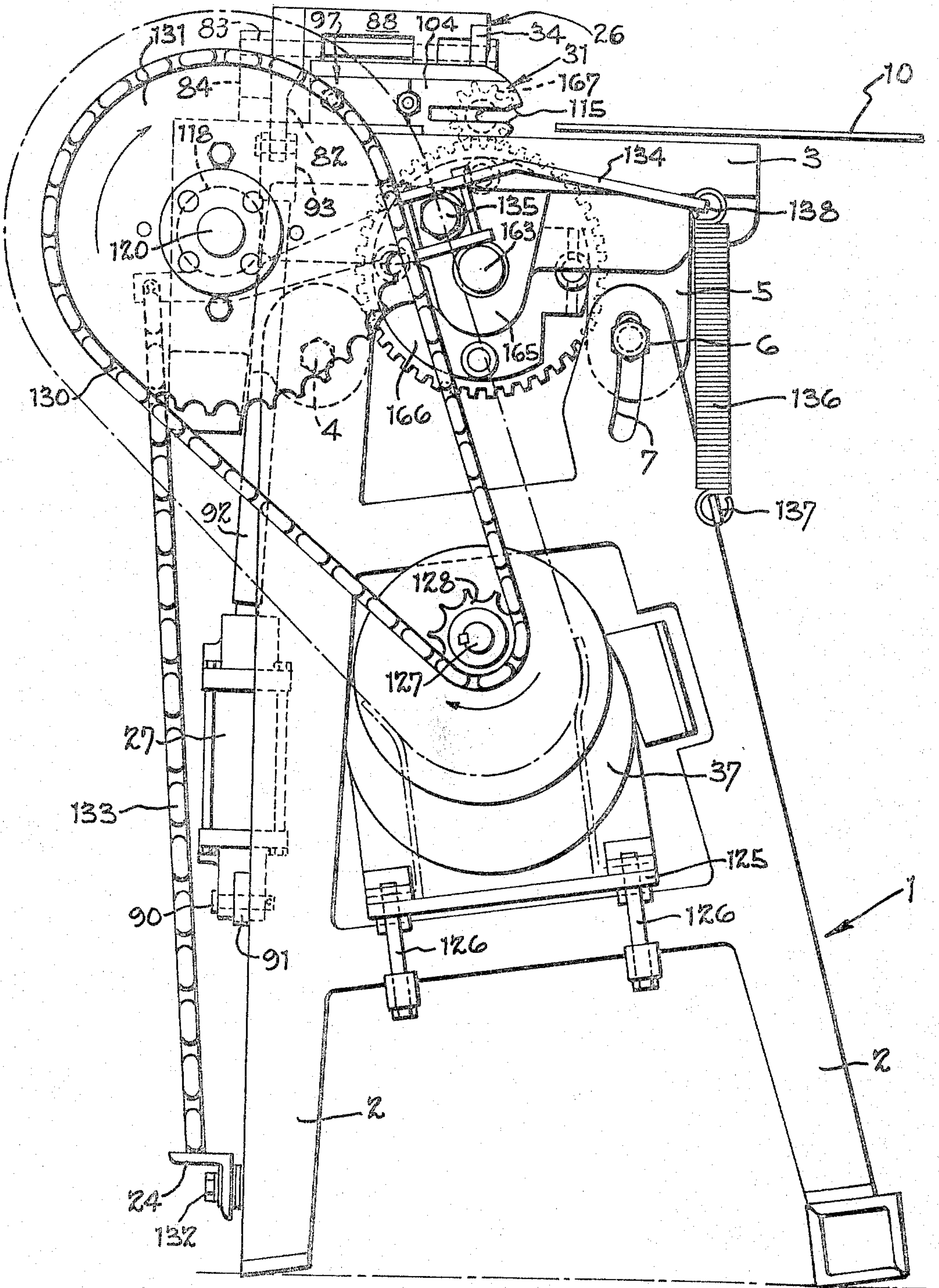
FIGURE 2 is a side elevation, taken along line 2—2 of FIGURE 1, illustrating, in a general way, the power drive and gear train of the helical wrapping mechanism.
Figure 3:
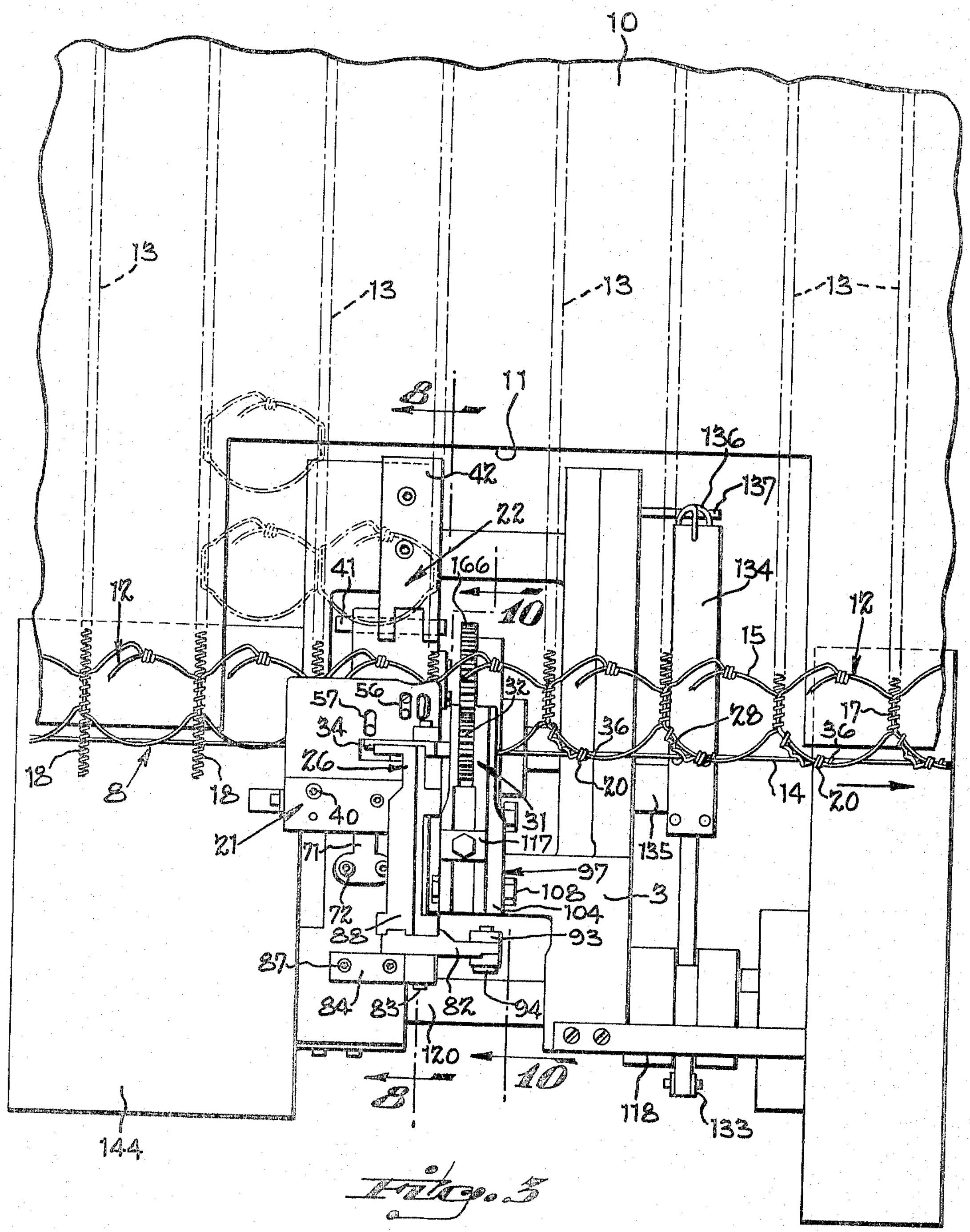
FIGURE 3 is a fragmentary top plan view showing the table which supports the spring assembly and also showing the wrapping components in relation to the table.

The drawings disclose a helical wrapping machine which has been found to best carry out the principles of the present invention. Referring specifically to FIGURES 1–3, the machine, in general, comprises a frame structure, indicated generally at 1 including legs 2, preferably formed of structural steel members. The legs 2 have their upper ends joined to a rigid bed 3. The legs support the bed 3 and operating components of the machine at an elevation convenient to the operator. As best shown in FIGURE 2, the bed 3 is pivotally connected by a pair of bolts 4—4 to the forward pair of legs 2. The rearward portion of the bed 3 includes a pair of depending lugs 5—5 which are shiftably connected by clamping bolts 6 to the rearward pair of legs 2. The rearward legs each include an arcuate slot 7 traversed by the clamping bolts 6, the arrangement being such that the angular position of the bed 3 may be adjusted with respect to the frame 1 in order to position the operating components of the wrapping machine accurately with respect to the spring unit.

The spring unit, which is indicated generally at 8 (FIGURE 3), is supported on table 10 which extends in a horizontal plane rearwardly from the operating components of the machine. In the present example, the table is in the form of a sheet metal plate and is supported at the proper elevation (FIGURE 2) by a support structure (not shown), which is joined to the frame structure 1. To provide clearance for the components of the wrapping mechanism, the forward edge portion of the table includes a cut-out portion 11 (FIGURE 3). As explained later, the portion of the spring unit 8 in the cut-out area 11 is supported with reference to the components of the wrapping mechanism by a locating device which clamps the coil springs, border wire, and helical during the cycle of operation.

Described generally, the spring unit 8 is of the type used in mattresses, bed springs and the like. The spring unit comprises rows of coil springs indicated generally at 12 and joined together at the top and bottom by transverse helicals 13. The spring unit is bounded on all four sides by upper and lower border wires 14.

Each coil spring, in the present example, is generally of hour glass shape, as viewed from the side (FIGURE 32), with enlarged terminals 15—15 at the top and bottom. The terminals 15 lie in level planes and delineate the top and bottom surface of the spring unit. Each terminal 15 includes opposed straight portions 17 which mate with one another to facilitate the application of the transverse helicals 13 which are laced about the adjacent mating straight portions 17 at the top and bottom of each terminal coil.

Figure 18:
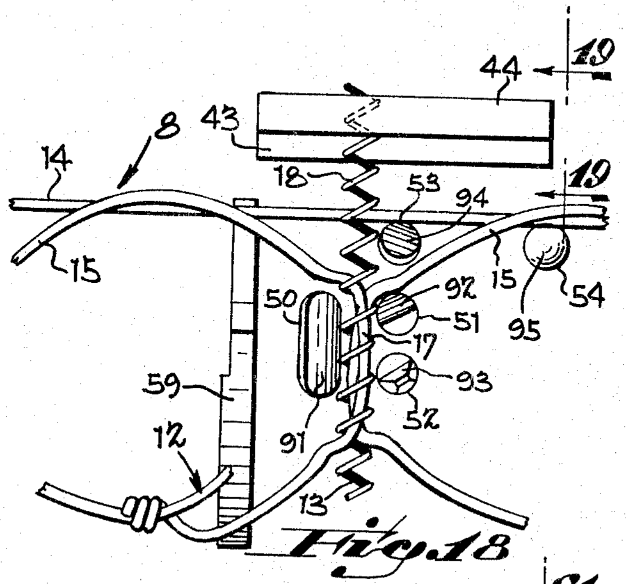
FIGURE 18 is a diagrammatic top plan view with the parts in a position corresponding to FIGURE 15, showing the relationship of the parts at the beginning of an operating cycle.
Figures 30, 31, 32:
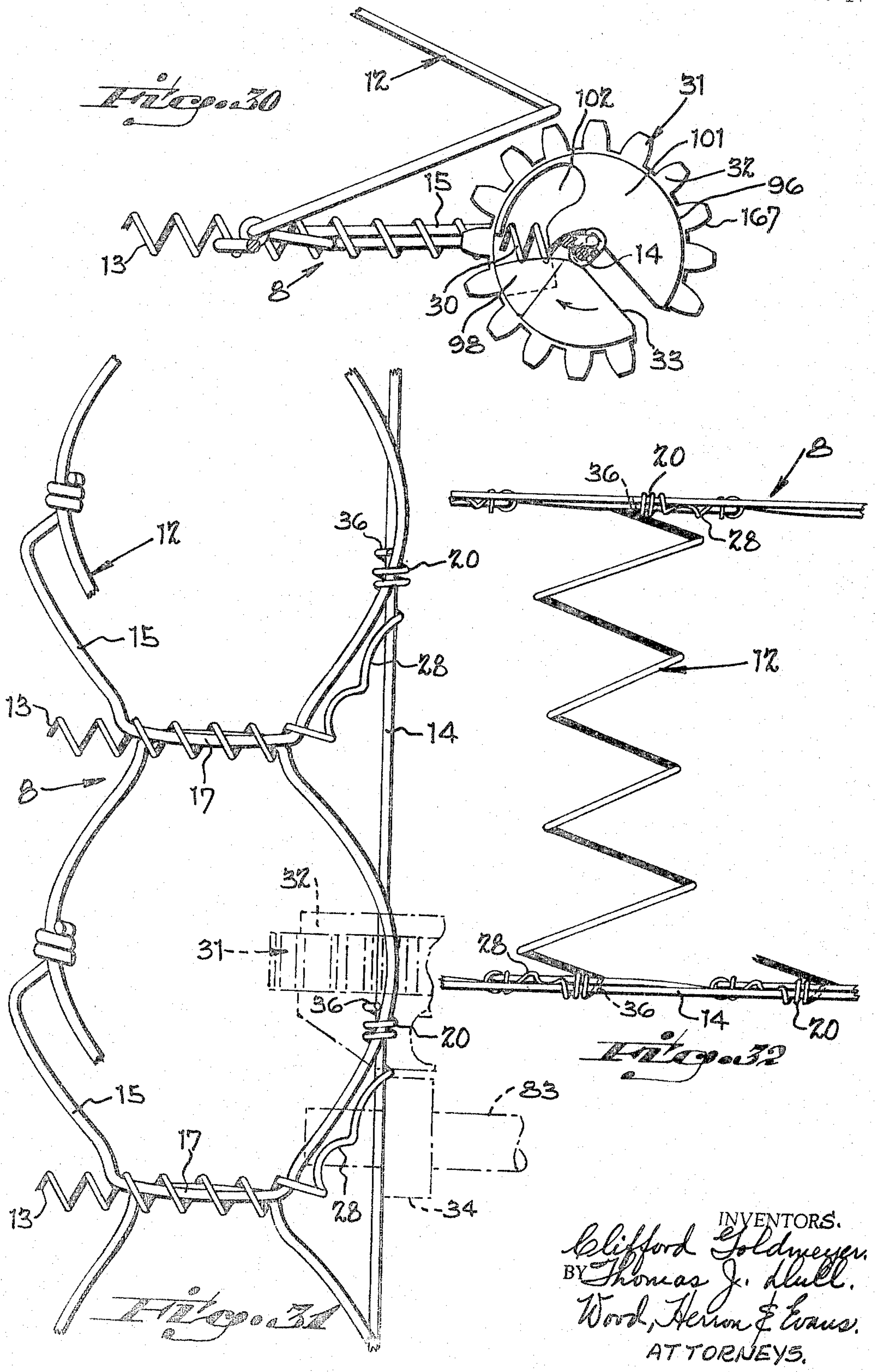
FIGURE 30 is a fragmentary view similar to FIGURE 29 showing the rotary motion of the wrapping gear with respect to the helical during the wrapping operation.
FIGURE 31 is a fragmentary bottom plan view, showing the end portion of the helical wrapped about the terminal coil and border wire at completion of the wrapping operation.
FIGURE 32 is a side elevation of the spring assembly showing the wrapped end portions of the upper and lower helicals which join the upper and lower terminals to the border wires.

In assembling the spring unit 8, prefabricated coil springs 12 are located in row formation, the rows extending transversely across the width of the spring assembly, with the straight portions 17 of the terminals in mating relationship (FIGURES 3 and 31). Thereafter, the helicals 13 are located and advanced in cork screw fashion transversely across the spring assembly by means of a helical feeder. The transverse helicals 13 are thus laced about the mating straight portions 17, thereby to tie the joining rows of coil springs to one another. At completion of the lacing operation, an end portion of each transverse helical, as indicated at 18, projects outwardly beyond the border wire 14 (FIGURES 3 and 18). The projecting portion 18 of the helical subsequently is utilized to tie the marginal terminals 15 to the border wire 14, as explained later.

An automatic machine for fabricating the spring unit to this stage is disclosed in the aforesaid Greeno et al. Patent 3,045,714. According to conventional practise, by way of example, marginal terminals 15 have been connected to the border wires 14 by threading a longitudinal helical (not shown) upon the upper and lower border wires and terminals. In other instances, the terminals may be joined to the border wires by means of separate clips or individual tie wires.

While the spring assembly fashioned in this manner is highly satisfactory, the transverse helicals 13 have a tendency to be rotated through flexing of the spring unit after prolonged use, causing an end portion of the helical to project beyond the border wire at one side of the spring unit or mattress. In order to prevent this action, the ends of the helicals, according to the prior practice, may be deformed in some manner to prevent rotation. By way of example, the aforesaid patent to John L. Greeno et al., 3,090,407 discloses a machine which forms a loop at opposite ends of the helical to prevent the unscrewing action.

As noted above, the present helical wrapping machine utilizes the projecting end portion 18 (FIGURE 3) to tie the terminal coils to the border wire. This arrangement thus eliminates the need for longitudinal border helicals, clips, tie wires or the like, thus bringing about a substantial saving in manufacturing costs and also in material. Moreover, the end portion 18 of the helical, when wrapped about the terminal and border wire, firmly anchors the helical against axial displacement, thus eliminating the necessity of forming loops at the ends of the helicals, as noted above.

The helical wrapping machine of the present invention is intended to form a part of the production line, as noted above, and is adapted to receive the spring units as they issue from the assembly machine, such as disclosed in Patent 3,045,714. Thus, as the spring unit 8 is completed, it is transferred from the assembly machine to the table 10 of the wrapping machine.

*Operation*

After being placed upon table 10, the spring unit 8 is advanced (in the present example by hand) toward the right as indicated by the arrow in FIGURE 3. In order to locate the helical 13 and terminal 15 in operating position, the machine is provided with a stationary locating head, indicated generally at 21 (FIGURES 3 and 9–11). As shown in FIGURE 3, several of the transverse helicals 13 to the right side of head 21 have been wrapped as at 20, the operation being carried out with respect to the individual helicals as the spring unit is advanced in stepwise fashion toward the right.

Figure 21:
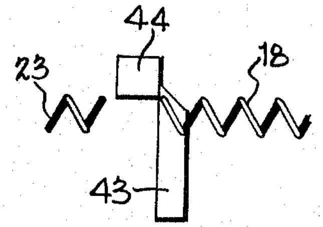
FIGURE 21 is a sectional view taken along line 21—21 of FIGURE 20, further illustrating the cut-off operation. The parts in this view are shown in the position corresponding to FIGURE 16.
Figure 20:
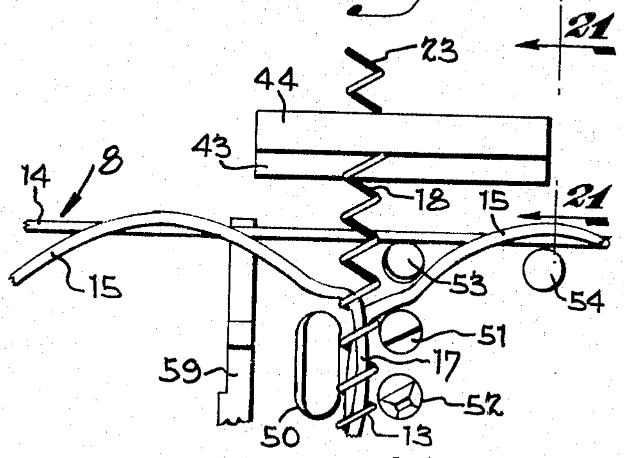
FIGURE 20 is a diagrammatic view similar to FIGURE 18, showing the lower cut-off knife in its elevated position to sever or trim off the end portion of the helical.
Figure 22:
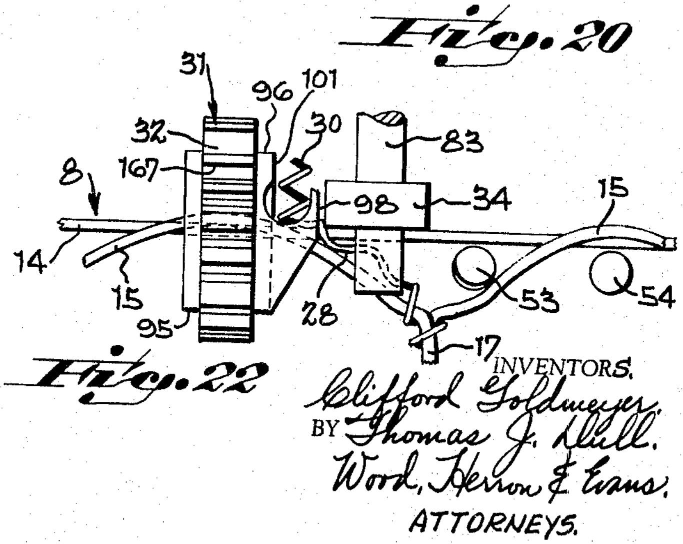
FIGURE 22 is a fragmentary top plan view similar to FIGURE 20, showing the stretching and guide finger shifted to the advanced position to locate the end portion of the helical within the wrapping gear. The parts in this view correspond in position with FIGURE 17.
Figure 23:
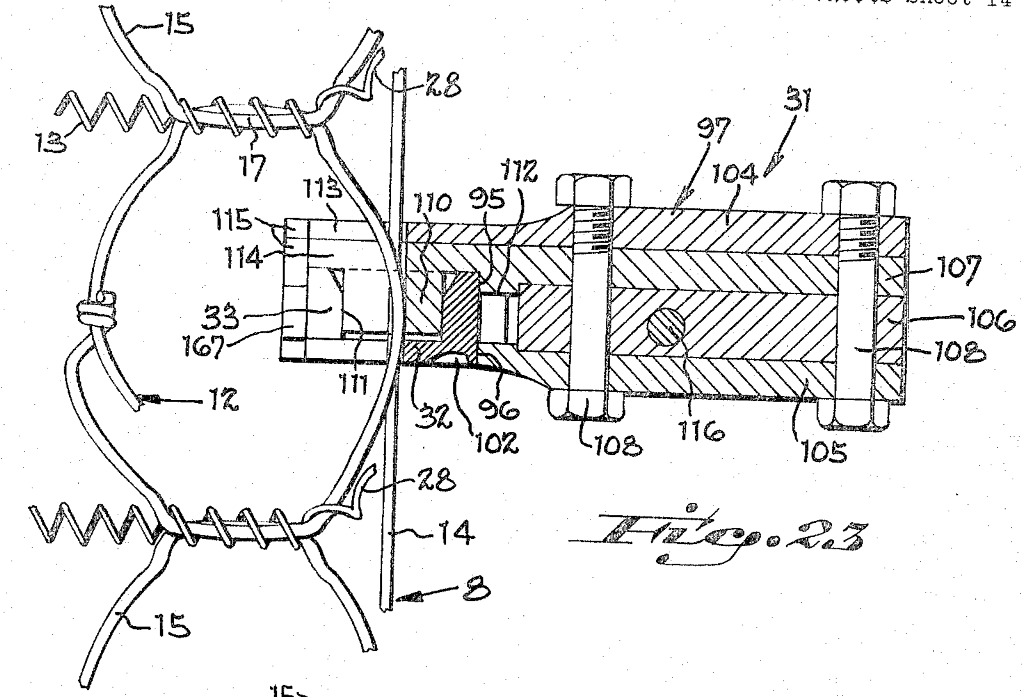
FIGURE 23 is a sectional view taken along line 23—23 of FIGURE 4, further detailing the wrapping gear, the parts being shown in the dwell position at the start of the wrapping cycle.

After the helical 13 is properly located, as explained later, a cut-off mechanism, indicated generally at 22 (FIGURES 3, 11 and 12) is activated to sever the end portion 23 of the helical (FIGURES 20 and 21) so as to trim the projecting portion 18 to a predetermined length with respect to the border wire. The operating cycle, in the present example, is automatic and is initiated by depressing a treadle 24 (FIGURES 1 and 2). As best shown in FIGURE 1, the cut-off mechanism is powered by an air cylinder 25 which is pivotally connected to the frame structure 1. It will be noted in FIGURES 12 and 13, that the cut-off mechanism 22 coacts with the stationary locating head 21 to locate and clamp the helical, border wire and terminal securely in registry during the stretching and wrapping operations.

After having been trimmed to the proper length and clamped, a helical stretching mechanism, indicated generally at 26 (FIGURES 3 and 14–17), engages the projecting end portion 18 and forces the end portion toward the right as viewed in FIGURE 3. For clarity, FIGURES 14–17 are sectional views taken along line 14—14 of FIGURE 12 and illustrate the stretching mechanism 26 as viewed from the rearward portion of the machine; hence, the helical portion 18 is shown bent toward the left in FIGURES 14–17, reversed from the position shown in FIGURE 3.

The stretching mechanism 26 is actuated by a second air cylinder 27 (FIGURES 1 and 2), which is pivotally connected to the frame structure adjacent the air cylinder 25 of the cut-off mechanism. The air cylinder 27 of the stretching mechanism is activated automatically in sequence with the cut-off air cylinder 25 so as to stretch the helical portion 18 after the helical trimming operation takes place. As best shown in FIGURES 17 and 25–28, the stretching mechanism 26 stretches a portion of the helical to the elongated shape indicated at 28, with the intact end portion 30 of the helical bent angularly from the stretched portion 28 and extending parallel with the main portion of the helical 13 but offset laterally therefrom.

By virtue of the stretching operation, the offset end portion 30 of the helical is located in a position to be engaged by the wrapping mechanism, which is indicated generally at 31 (FIGURES 22–27). The wrapping mechanism essentially comprises a wrapping gear 32 which engages the offset helical end portion 30 and which rotates and wraps the end portion 30 about the adjoining portions of the border wire 14 and terminal 15 (FIGURES 30–32). As best shown in FIGURE 30, the wrapping gear 32 includes a slot 33 which extends inwardly to the axis of rotation of the gear. The border wire 14 of the spring unit resides within the slot 33 at the axis of rotation of the gear 32 during the wrapping operation.

Figure 28:
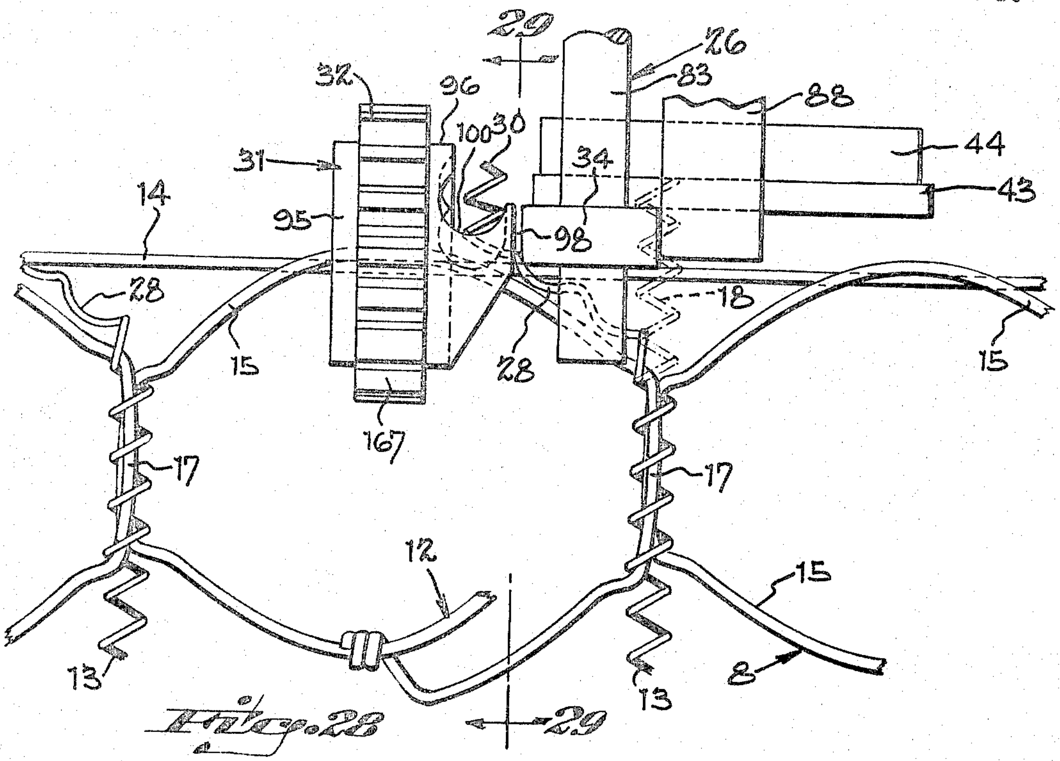
FIGURE 28 is a diagrammatic plan as viewed along line 28—28 of FIGURE 17, further illustrating the position of the parts during the helical bending operation.
Figure 29:
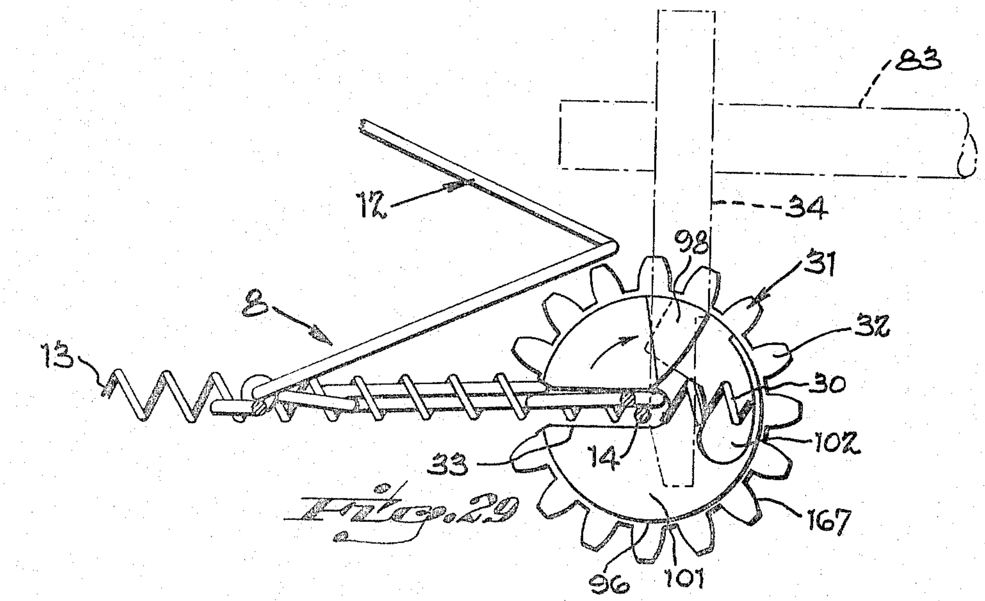
FIGURE 29 is a view taken along line 29—29 of FIGURE 28, further illustrating the relationship of the parts during the helical bending operation, with the end portion of the severed helical located in position to be acted upon by the wrapping gear.

The slot 33 forms a throat to receive the border wire and the adjoining portion of the terminal, with the slot disposed in the horizontal position shown in FIGURE 29 at the start of the wrapping cycle. During the wrapping operation, the end portion 30 of the helical, which is engaged by the wrapping gear 32, is confined in the wrapping gear by a finger 34 (FIGURES 17 and 28), which forms part of the helical stretching mechanism.

Figure 25:
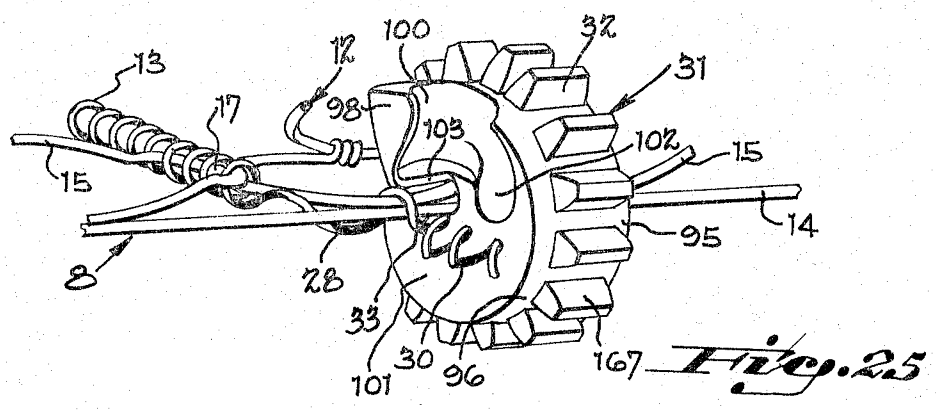
FIGURE 25 is a fragmentary perspective view, showing the wrapping gear at the beginning of the cycle, with the severed end portion of the helical stretched as in FIGURE 22 and in position to be wrapped about the terminal and border wire.
Figure 26:
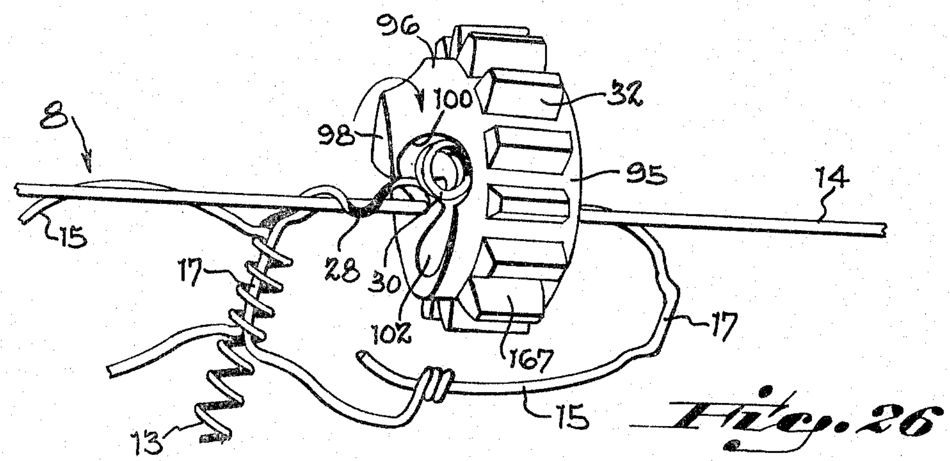
FIGURE 26 is a perspective view showing the wrapping gear in rotation at the beginning of the wrapping cycle.
Figure 27:
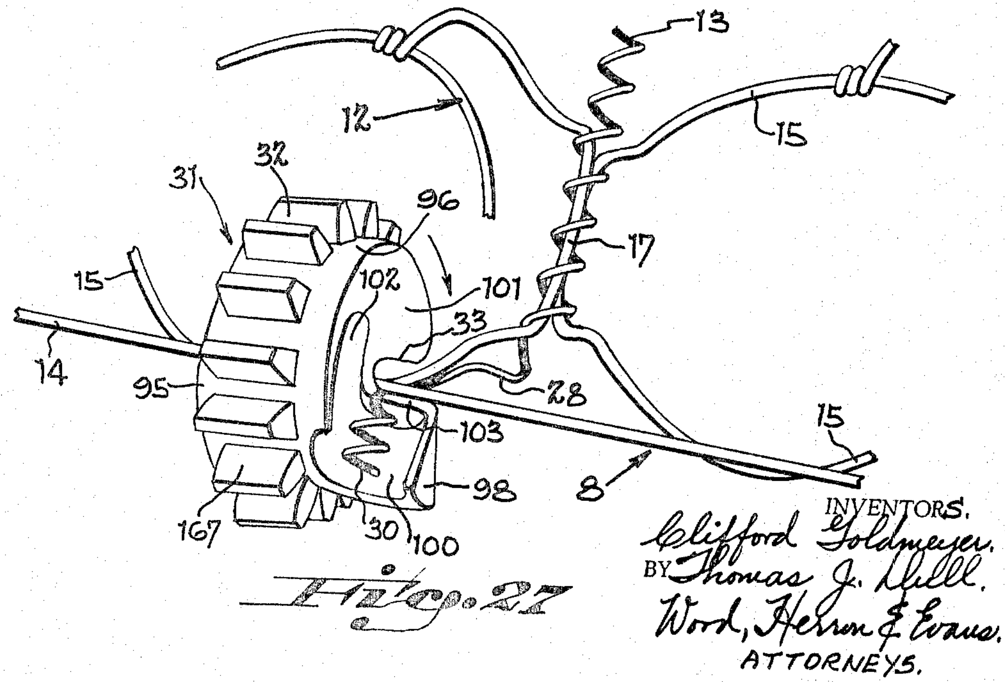
FIGURE 27 is a perspective view taken from below the spring unit and corresponding with FIGURE 26 to further illustrate the helical wrapping operation.

In order to carry out the wrapping operation, the wrapping gear 32 is rotated through three complete revolutions in the same direction as the lead of the helical (FIGURES 25–27). The helical end portion 30, during rotation of the wrapping gear 32, is confined in a recess formed in the wrapping gear, as explained later. During rotation of the wrapping gear, the helical end portion 30 is simply moved in an orbit around the border wire 14 and terminal 15 and is successively wrapped as at 20 to tie the two portions (FIGURE 31).

As shown in FIGURE 31, the end helical portion 30 provides two and one-half turns about the border wire and terminal, with the end 36 of the wrapped helical 20 located inwardly of the terminal 15. This is brought about by operation of the cut-off mechanism 22, which, in cooperation with the stretching mechanism and helical wrapper, controls the number of turns of the wrapped portion 20. Since the end 36 resides behind the terminal 15, the terminal conceals the end and prevents damage to the fabric covering which is later applied to the spring unit.

The wrapping gear is rotated by a gear head motor 37 (FIGURE 1), which is connected to the wrapping gear through a driving system, indicated generally at 38. At completion of the wrapping operation, a single cycle clutch disengages the motor 37 and also applies air pressure to the air cylinders 25 and 27 in a direction to lower the cut-off knife to the position of FIGURE 12 and to retract the stretching finger 34 back to the position shown in FIGURE 16. When the cut-off knife is thus retracted, the spring unit 8 is released from the locating head 21, permitting the spring unit to be shifted to the right to bring the next helical into operating position.

In order to index the spring unit for the next operation, it is first shifted rearwardly so as to disengage the border wire and terminal from the slot 33 of the wrapping gear 32. For this purpose, the wrapping gear stops in the horizontal position shown in FIGURE 29 at the end of each cycle, as noted earlier. After having been disengaged from the wrapping gear, the spring unit is indexed to the right and then shifted forwardly to bring the border wire and terminal into operating position within the slot 33 of the gear, with the next helical positioned under the locating head 21, subsequently to be clamped in place at the start of the next wrapping cycle.

After all of the terminals have been joined to the border wire 14 (for example lower border wire 14 and lower terminals 15), the assembly is turned over and the upper terminals 15 are joined in the same manner to the upper border wire 14. After the upper and lower terminals are joined along one side, the spring assembly is rotated through an arc of 180° to bring the opposite side into operating relationship with the winding mechanism and the same operation is carried out with respect to the marginal terminals at top and bottom. In the present example, the marginal terminals at opposite ends of the spring assembly are connected to the traverse border wires in the conventional manner, such as by threading on separate helicals about the end border wires and terminals.

It will be understood from the foregoing, that instead of acting upon the upper and lower border wires individually, it is also contemplated to mount two wrapping mechanisms, one above the other so as to act upon the upper and lower terminals and border wires concurrently, thereby substantially increasing the production of rate. In this event, both wrapping mechanisms are identical, both utilizing the same principle of operation.

*Locating mechanism*

As noted earlier (FIGURES 3 and 9–11), the locating mechanism comprises a stationary locating head 21 coacting with the cut-off mechanism 22, the two components being arranged to clamp the helical 13 in a fixed position while the cut-off mechanism 22 trims the projecting portion 18 of the helical to the proper length. After being trimmed, and while still clamped in the locating mechanism 21, the end portion 18 is stretched by the stretching mechanism 26, then the trimmed end is engaged by the wrapping mechanism and wound about the adjoining portions of the border wire 14 and terminal coil 15.

Referring to FIGURES 9–13 the locating head 21 is bolted as at 40 to the bed 3 of the machine and projects in cantilever fashion above the cut-off mechanism 22. The cut-off mechanism includes an arm 48 pivotally connected as at 41 to a block 42 which is also attached to the bed 3 for cooperation with the locating head 21. As noted earlier, the cut-off arm is reciprocated by the power cylinder 25 and normally resides in the lowered position shown in FIGURE 12.

Figures 12, 13:
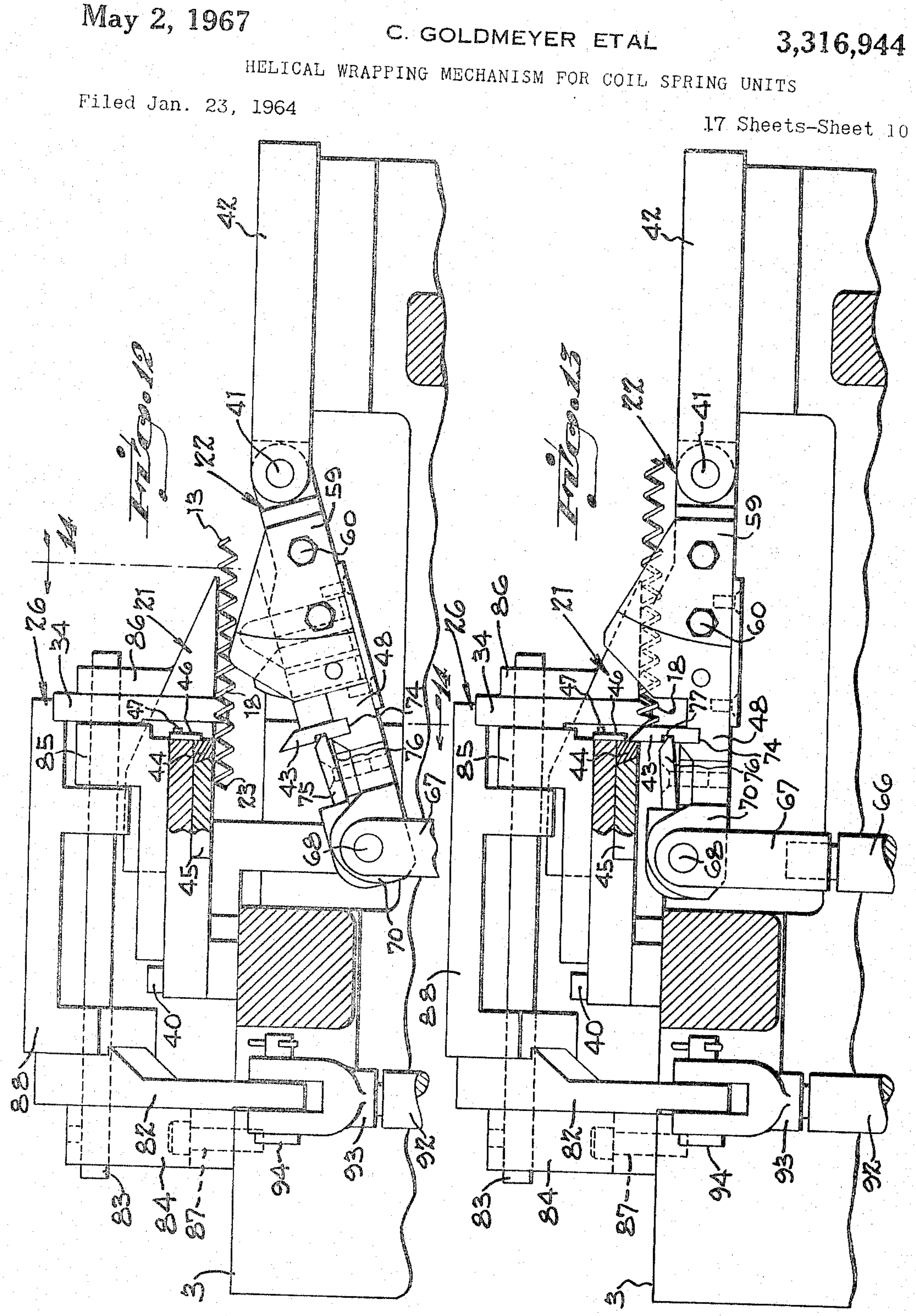
FIGURE 12 is an enlarged fragmentary end view, generally similar to FIGURE 10, showing the lower shiftable locating anvil and cut-off knife in the lowered position relative to the upper stationary locating head. The parts assume this position at the end of an operating cycle to permit the spring assembly to be shifted to bring a successive helical into severing and locating position.
FIGURE 13 is a view similar to FIGURE 12 but showing the lower shiftable locating anvil and lower cut-off knife in the elevated position at the start of an operating cycle.
Figure 14:
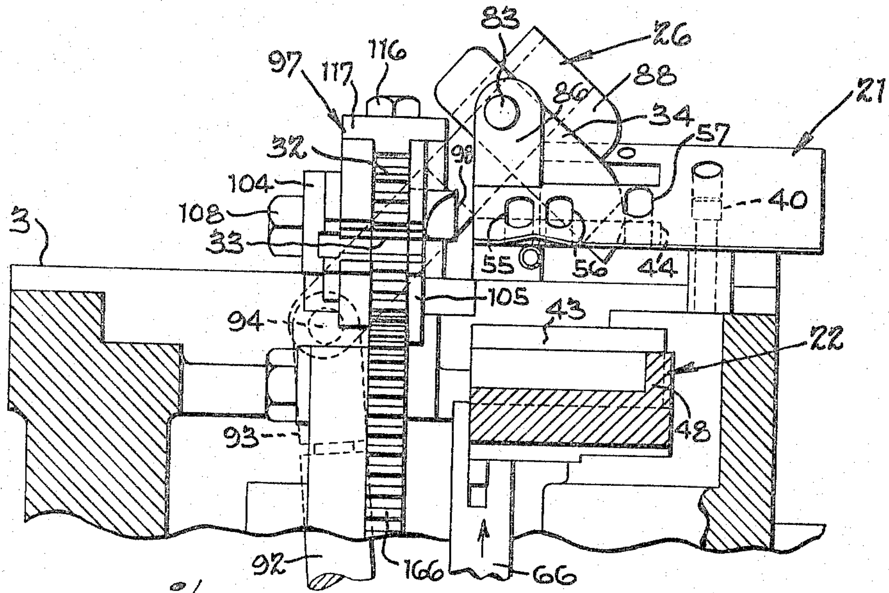
FIGURE 14 is a fragmentary sectional view taken along line 14—14 of FIGURE 12, further illustrating the position of the lower shiftable locating anvil and cut-off knife in the lowered position relative to the upper stationary locating head and also illustrating the helical bending and guide finger in its retracted position at the start of an operating cycle.
Figure 15:
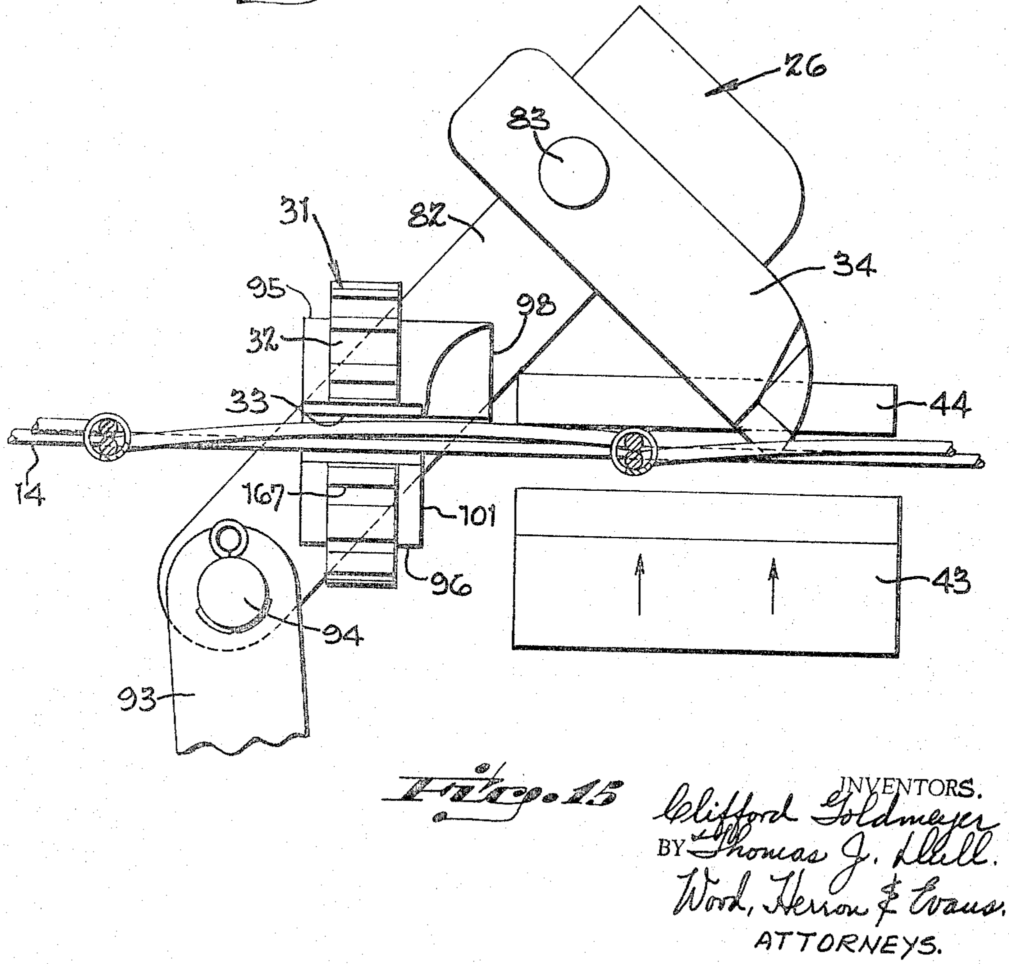
FIGURE 15 is an enlarged diagrammatic view, further illustrating the helical bending and guiding finger in its inactive retracted position and also illustrating the relationship of the spring unit to the helical wrapping gear.

After the spring unit 8 has been shifted to bring the helical 13 and its projecting end portion 18 in registry with the locating head, as explained earlier, the air cylinder 25 is activated to shift the cut-off arm 48 upwardly from the position of FIGURE 12 to the clamping and locating position of FIGURE 13. As described later in detail, the cut-off arm includes a shiftable shearing blade 43 which coacts with a stationary shearing blade 44 carried by the locating head 21. As best shown in FIGURE 12, the stationary shearing blade 44 is clamped in place in the locating head between a block 45 and a clamping bar 46 which is secured by a screw 47 to the head 21.

In order to locate and clamp the helical and the adjacent portions of the terminal end border wire, the swinging arm 48 is provided with locating pins, as explained below, which engage the helical 13, the border wire 14, and the terminal 15 in proper relationship with one another. The locating and clamping action takes place as the swinging arm 48 of the cut-off mechanism shifts upwardly to the position of FIGURE 13 so as to trim the helical and clamp it during upward motion of arm 48.

Figures 9, 10:
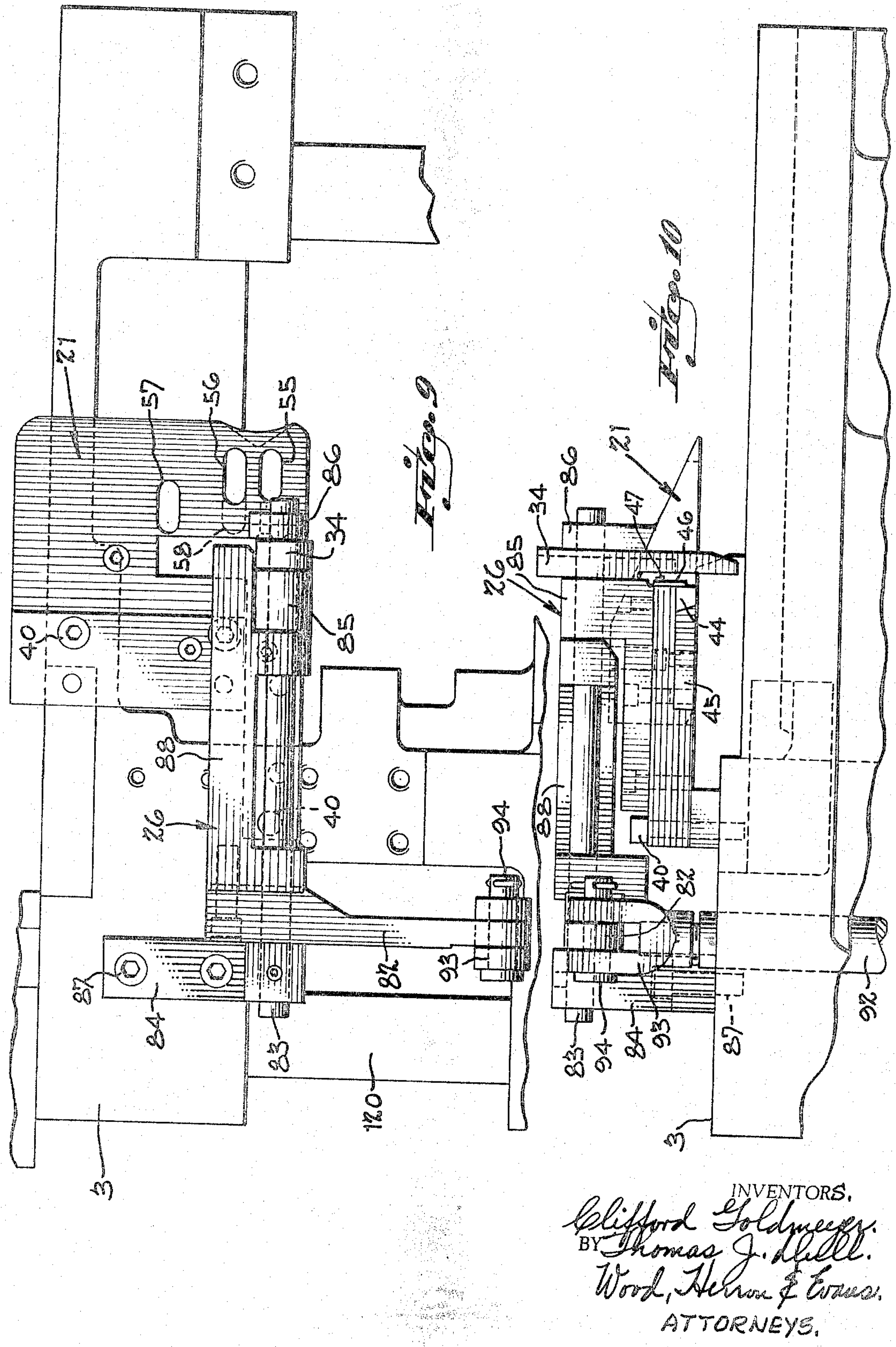
FIGURE 9 is a fragmentary top plan view similar to FIGURE 7 but with the upper stationary locating head in position, and with the shiftable locating anvil and cut-off knife omitted.
FIGURE 10 is an end view projected from FIGURE 9, further illustrating the stationary locating head, the upper knife and associated mechanism. This view is also indicated along the line 10—10 of FIGURE 3.
Figure 11:
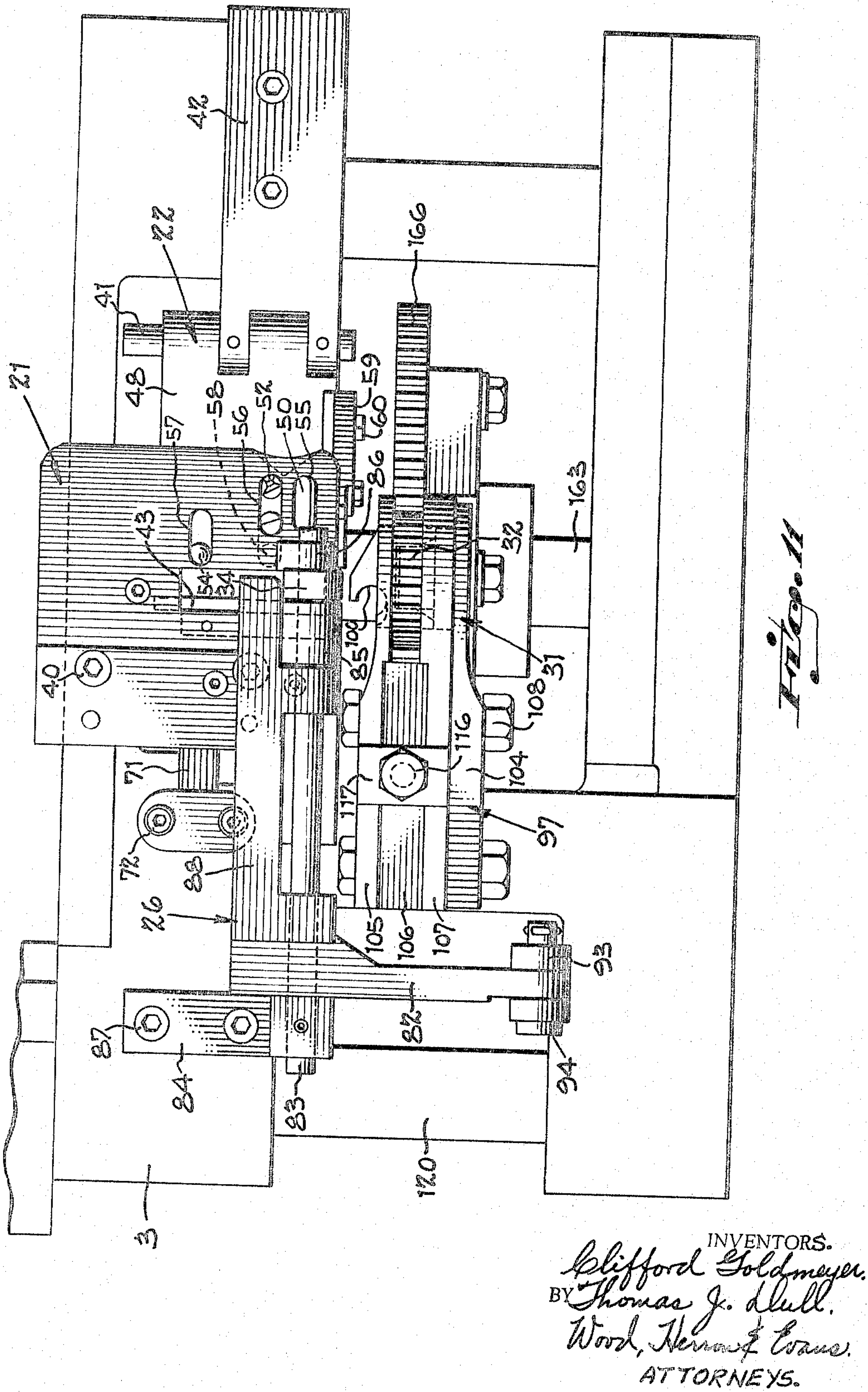
FIGURE 11 is a fragmentary top plan view similar to FIGURE 10, showing the upper stationary locating head, with the shiftable locating anvil in place beneath the stationary head and with the wrapping gear assembly mounted in operating position adjacent the locating head.

Described in detail (FIGURES 7, 8 and 18), the swinging arm 48 of the cut-off mechanism includes five locating pins, indicated at 50, 51, 52, 53 and 54. The locating head 21 includes apertures 55, 56 and 57 and a recess 58 (FIGURE 9), which register with the five locating pins, as described below. Thus, as seen in FIGURE 9, the pin 50 interfits the aperture 55, the pin 53 interfits the recess 58, the pins 51 and 52 interfit the aperture 56, and pin 54 interfits the aperture 57.

Figures 7, 8:
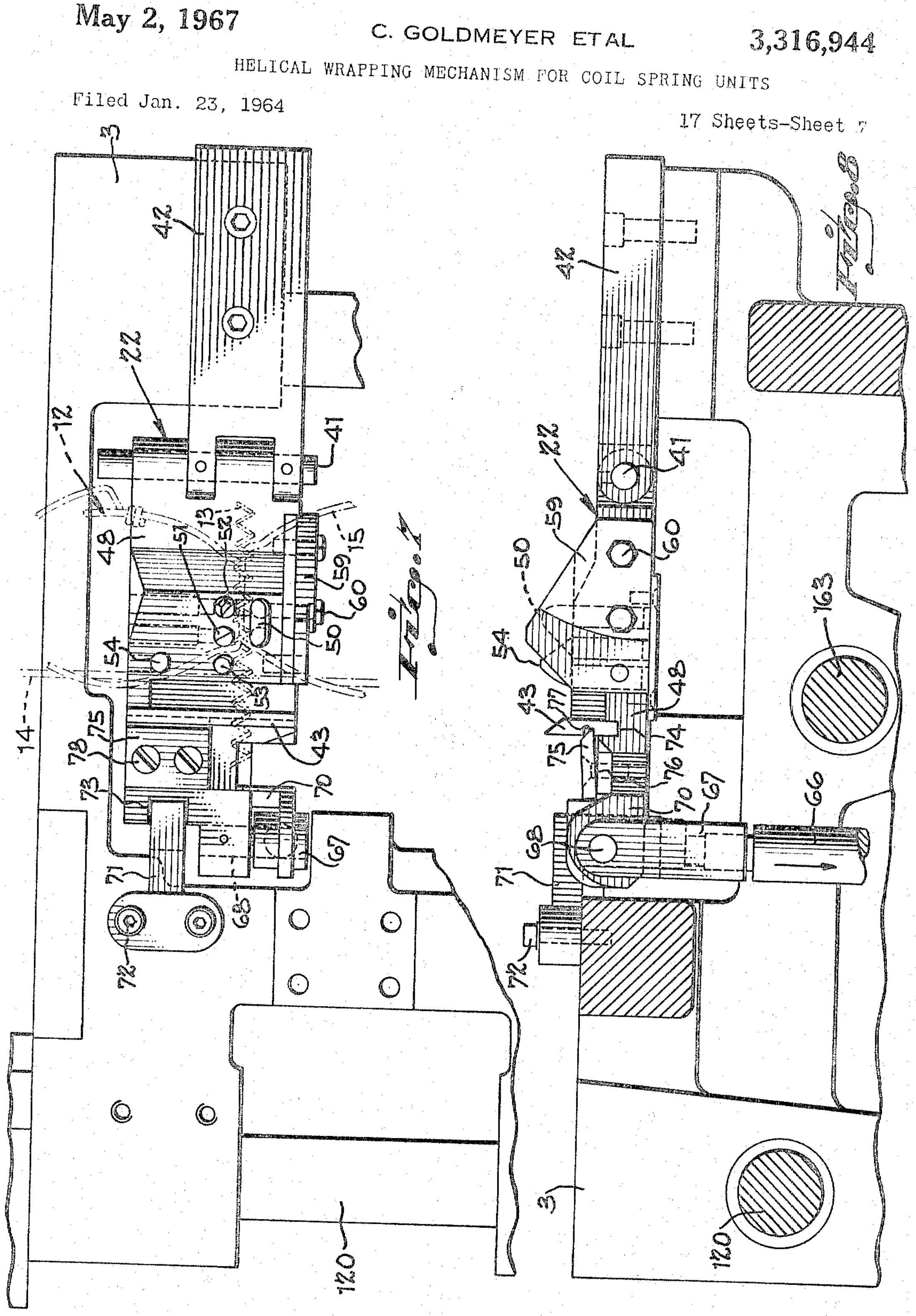
FIGURE 7 is an enlarged fragmentary top view corresponding to FIGURE 3, but with the upper locating head removed in order to illustrate the lower shiftable locating anvil and severing knife. This view is shown turned 90° in relation to FIGURE 3 for projection purposes.
FIGURE 8 is a fragmentary view taken along line 8—8 of FIGURE 3 and also projected from FIGURE 7, further illustrating the locating anvil and helical cut-off knife, with the upper stationary locating head removed.

The swinging arm 48 also includes a coil locating block or anvil 59 (FIGURES 7 and 8) having upper edges which are inclined downwardly from the center toward the opposite sides of the block. The locating block 59 engages one of the terminals 15 so as to locate the terminal accurately with respect to the helical shearing and wrapping apparatus. As shown in FIGURES 7 and 8, the coil locating block 59 is secured to one side of the arm 48 by the screws 60.

As best shown in FIGURE 18, the pin 50 is provided with a downwardly tapered upper end 61 and is arranged to provide a camming action with respect to the helical 13 to locate the helical during upward motion of the swinging arm 48. The upper end of pin 51 includes a downwardly tapered portion 62 which provides a camming action with respect to the opposite side of helical 13 and also with respect to terminal 15. The pin 52 also includes a tapered upper end indicated at 96, engageable with the helical.

Accordingly, the straight portions 17 of adjoining coils, and the helical, which is laced about the straight portions, are clamped securely in position between the pin 50 at one side and the pins 51 and 52 at the opposite side. In addition, the terminals 15 of the loose coil spring is positioned by the locating block 59 with respect to the adjacent terminal, which previously has been joined by the helical to the border wire 14.

In addition to the pins 50, 51 and 52, pin 53 also includes an upper end which is tapered as at 64. Pin 53 locates the border wire 14 in relation to the terminal during upward motion of spring arm 48. The upper end 65 of the fifth pin 54 is of conical configuration and also engages the border wire 14.

Briefly therefore, the pins 50–54 and the locating block 59 securely clamp the border wire, the terminals and the helical wire in registry with the cut-off and wrapping mechanism when the arm 48 is shifted upwardly. It will also be understood that the shearing blade 43 of the cut-off mechanism trims the end portion 23 of the projecting helical 18 at about the same time that the locating pins engage and clamp the components of the spring unit. Subsequently, the parts are held in the clamped position during the stretching and wrapping operation, as explained below. The components of the spring unit are unclamped at the end of the cycle, permitting the spring unit to be shifted toward the right (FIGURE 3) to align the next helical 13 with respect to the trimming and wrapping mechanism.

*Cut-off mechanism*

As noted earlier, the cut-off mechanism 22, which is actuated by the air cyclinder 25, carries out the first operation after the cycle in initiated by operation of treadle 24. As soon as the treadle is depressed, the cut-off arm 48, previously described, shifts upwardly from the position of FIGURE 12 to the position of FIGURE 13, causing the shearing blade 43 to sever the end helical portion 23 from the projecting helical portion 18, and concurrently to clamp the components of the spring unit 8.

Described in detail, (FIGURES 7, 8, 12 and 13) the cut-off arm 48 is connected to the air cylinder 25 by a push rod 66 having a clevis 67 secured to its upper end. Clevis 67 is pivotally connected by a pin 68 to a lug 70 projecting from the swinging end portion of arm 48. In order to guide the swinging arm 48 laterally, a stabilizing block 71 (FIGURE 7) is mounted as at 72 on the bed 3. The stabilizing block 71 interfits a slot 73 formed in swinging end portion of cut-off arm 48.

The shearing blade 43 of cut-off arm 48 is seated in a cross groove 74 formed in the swinging portion of arm 48. Blade 43 is secured in place by a retainer bar 75 seated in a recess 76 and having an outer end engaged in a notch 77 formed in the blade 43. The retainer bar 75 is secured in place by screws 78 (FIGURE 7).

As best shown in FIGURE 1, air cylinder 25, which operates the cut-off mechanism, is pivotally connected as at 80 to a bar 81 which forms a part of the leg structure 2. This arrangement permits the cylinder 25 and push rod 66 to swing angularly during the operating stroke of the cut-off mechanism.

From the foregoing, it will be understood that during the initial portion of the cycle, the cut-off mechanism 22 severs the helical end portion 23 (FIGURES 12 and 13) immediately after the treadle 24 is depressed so as to reduce the projecting portion 18 of the helical to a uniform length to provide the required number of turns to be wrapped about the terminal and border wire. The cut-off mechanism, as noted above, also coacts with the locating head 21 to clamp the helical, terminal and border wire firmly in place during the subsequent stretching and wrapping operations, as explained below.

*Helical stretching mechanism*

As best shown in FIGURES 1, 11, 14–17 and 22, the stretching mechanism 26 comprises an arm 82 pivotally mounted as at 83 to brackets 84, 85 and 86. The bracket 84 is secured by screws 87 to the bed 3 of the machine. The brackets 85 and 86 form a part of the locating head 21. The stretching finger, previously indicated at 34, is attached to a yoke 88 which is pivotally mounted upon the pivot shaft 83 between the brackets 85 and 86. The actuating arm 82 is rigidly attached to the opposite end of yoke 88. Rocking motion is imparted to the arm 82 by the air cylinder 27 (FIGURE 1). It will be understood at this point, that energization of the air cylinder shifts the stretching finger 34 from the position shown in FIGURE 16 to the position shown in FIGURE 17.

As best shown in FIGURE 1, air cylinder 27 has its lower end pivotally connected as at 90 to a cross bar 91 spanning the legs 2 of the frame structure. A push rod 92 projects upwardly from the air cylinder 27 and includes a clevis 93 pivotally connected as at 94 to the swinging end of arm 82.

Figure 17:
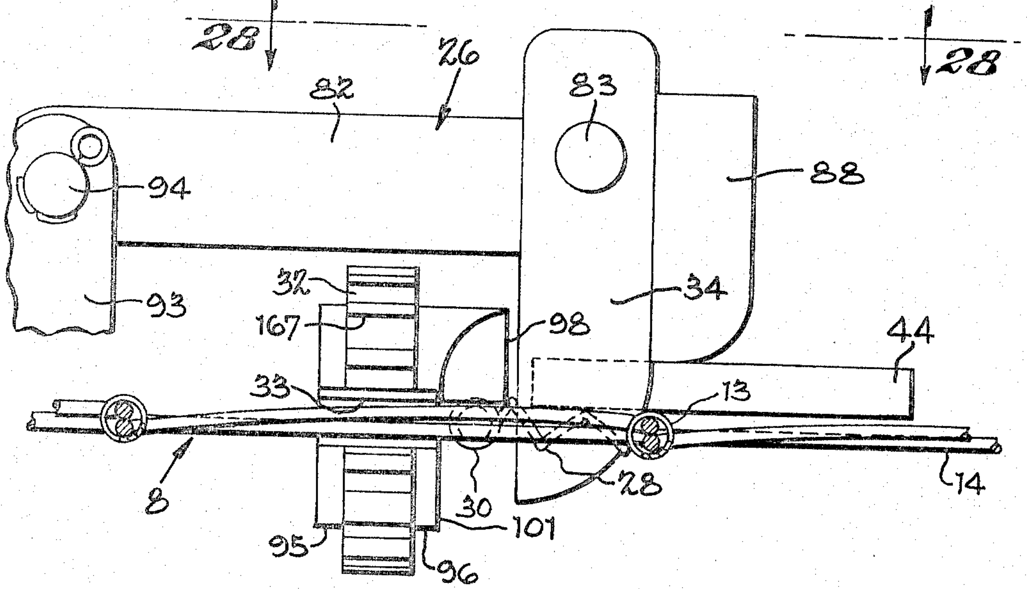
FIGURE 17 is a diagrammatic view similar to FIGURE 16, showing the helical bending and guide finger in its active position, with the end portion of the helical stretched, with the end portion bent to its wrapping position with respect to the wrapping gear.
Figure 19:
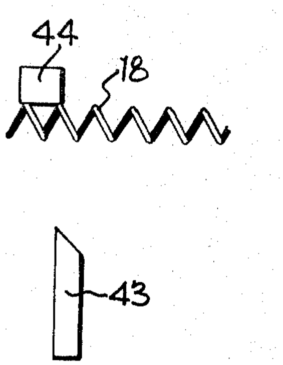
FIGURE 19 is a diagrammatic sectional view taken along line 19—19 of FIGURE 18, showing the lower cut-off knife in its lowered position before the start of the cycle.

As noted earlier, the stretching cylinder 27 is energized after the energization of the cut-off cylinder 25, the sequence being regulated by the control apparatus of the machine in sequence in response to operation of treadle 24. As best shown in FIGURES 17, 28 and 29, the stretching finger 34 engages the end portion 18 of the helical and shifts it laterally (to the left as viewed in FIGURES 17, 28 and 29 and to the right as viewed from the front of the machine—FIGURE 3). In stretching the helical, the finger 34 forms the stretched portion.

previously indicated at 28, and bends the helical end portion 30 at right angles to the stretched position in position to be engaged by the wrapping gear 32. It will be noted in FIGURES 22 and 28 that the helical end 30 is disposed substantially in parallelism with the main helical 13 in a position to be engaged by the wrapping gear 32 during the next portion of the cycle.

*Wrapping mechanism*

Upon completion of the stretching operation (stretching mechanism 26), the control system activates the wrapping mechanism, previously indicated at 31, which includes the wrapping gear 32. As best shown in FIGURES 23–29, the wrapping gear 32, on opposite sides, includes hubs 95 and 96. As explained below, the hubs 95 and 96 are journalled in a bearing assembly, indicated at 97, which supports the wrapping gear 32 for rotary motion.

As noted earlier, the wrapping gear 32 (FIGURE 29) is provided with an open slot or throat 33 which resides in a horizontal position at the start of the wrapping operation. As shown in this view, the border wire 14 and a portion of the terminal 15 reside at the axis of rotation of wrapping gear 32 during the locating, cut-off, and stretching operations. After these operations are carried out, the driving system 38 rotates the wrapping gear 32 through three complete revolutions to carry out the wrapping operation. At the end of the cycle, the gear is stopped with the slot 33 in the horizontal position to permit the spring unit to be withdrawn from the slot and indexed for the next cycle of operation.

As best shown in FIGURES 25–29, the hub 96 of the wrapping gear 32 includes a lug 98 projecting outwardly, with a semi-circular recess 100 formed at the leading edge of the lug 98 in the direction of rotation of the wrapping gear 32, as indicated by the arrow. The face 101 of hub 96 further includes an arcuate channel 102 leading to the recess 100. The arcuate channel 102 aids in leading the helical end portion 30 into the recess 100 during rotation of the wrapping gear.

At the start of the wrapping operation, the offset helical end portion 30 of the helical rests against the face 101 of hub 96 and is confined in this position by the stretching finger 34 for the wrapping operation (FIGURES 17 and 28). As the wrapping gear 32 begins to rotate (FIGURES 25–27) in the direction indicated, the helical end portion 30 is engaged in the arcuate recess 100 and is forced in an orbit about the border wire 14 and adjacent terminal portion 15 during the three revolutions of the wrapping gear.

The inner end of the semi-circular recess 100 is delineated by a ledge or end wall 103, as best shown in FIGURE 27. It will be noted in this view, that the helical 30 passes across the ledge 103 and into the recess 100 during rotation of the wrapping gear. The ledge 103 applies a frictional drag with respect to the helical end portion 30, thereby creating a pulling force with respect to the stretched portion 28. By virtue of the frictional pull thus provided, the turns of the helical end portion 30 are drawn tightly about the border wire and terminal, thereby to securely bind the terminal 15 to the border wire 14 (FIGURES 30–32). It will be understood that this action causes the helical end portion to be rotated within the recess 100 as it is unwound and wrapped. As noted earlier, the end 36 of the tie 20 is concealed behind the terminal in order to protect the fabric which subsequently is applied over the spring unit.

Described in detail (FIGURES 4, 23, and 24), the bearing assembly 97, which rotatably supports the wrapping gear 32, comprises a pair of side plates 104 and 105 spaced apart from one another by a spacer block 106 and an internal bearing plate 107. The side plates 104 and 105 are clamped against the spacer block and bearing plate by bolts 108. The side plate 105 includes a bore providing a bearing for the hub 96. The internal bearing plate 107 includes an internal bearing boss 110, which interfits a bore 111 formed in the wrapping gear 32. Bearing plate 107 further includes an external annular collar 112 which rotatably journals the hub 95 of gear 32.

Figure 4:
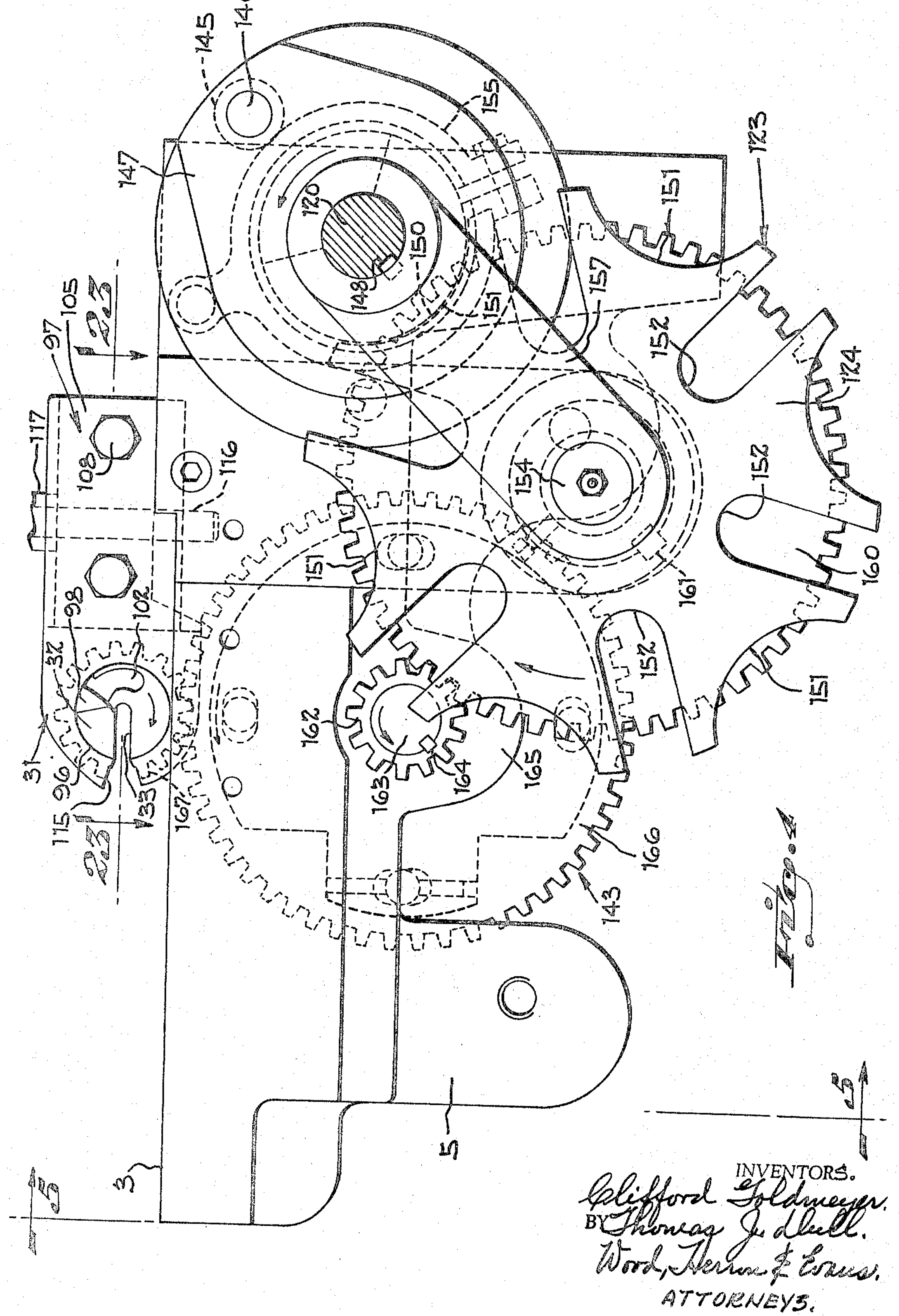
FIGURE 4 is en enlarged fragmentary end view, taken along line 4—4 of FIGURE 1, further illustrating the helical wrapping gear and its driving system.

It will be noted that the side plate 104 is slotted as at 113 (FIGURES 23 and 24), the slot extending horizontally and in registry with the slot 33 of wrapping gear 32; the internal plate 107 is similarly slotted as at 114. It will be seen (FIGURE 24) that the border wire and terminal are positively confined at the axis of gear 32 during rotary motion of the gear. To aid in positioning the border wire and terminal in the wrapping gear at the start of the cycle, the slot 33 of gear 32 and the ends of the side plate are flared as at 115 to provide a receiving throat (FIGURE 4).

Figure 6:
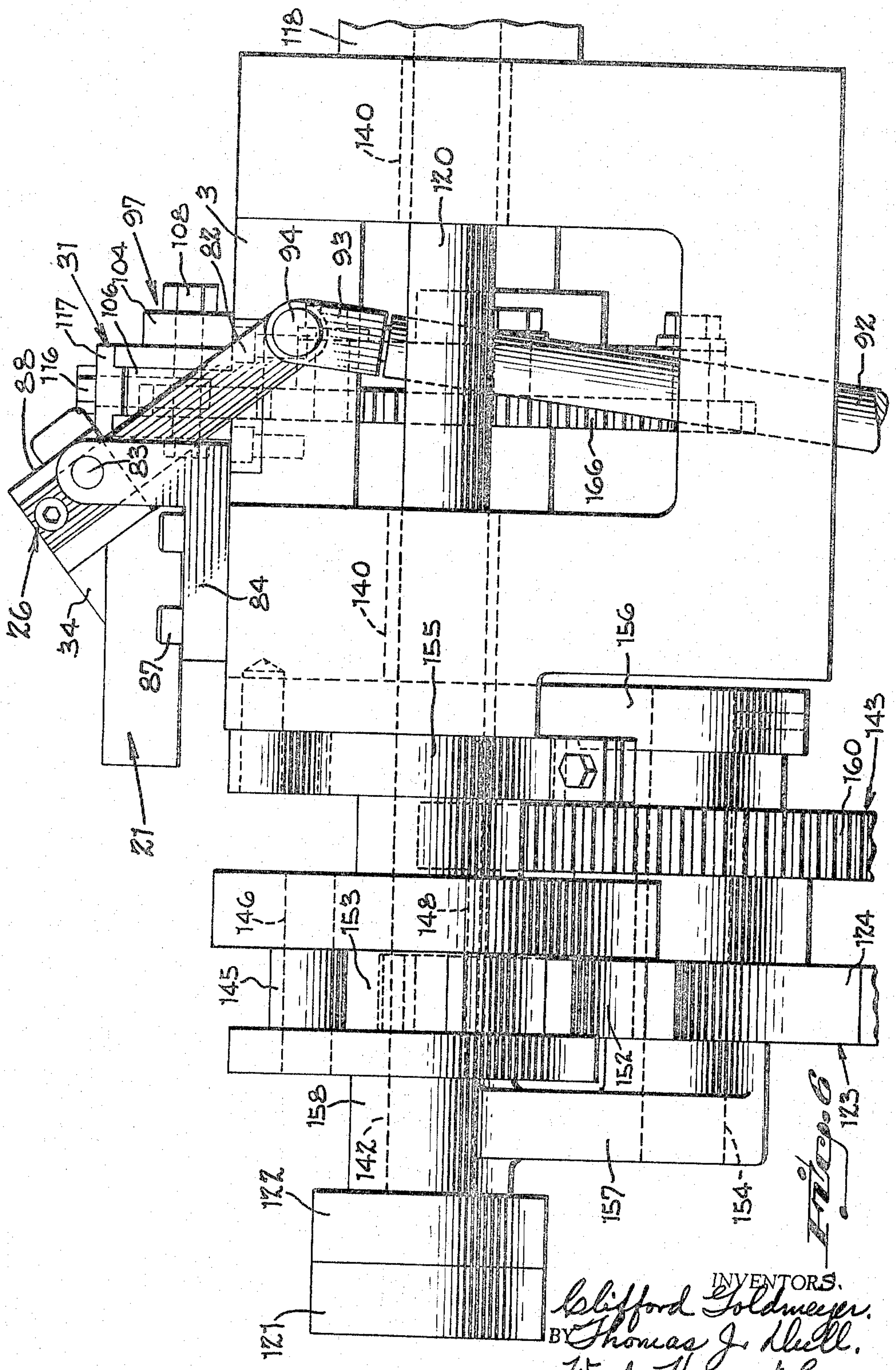
FIGURE 6 is an enlarged fragmentary side view, corresponding to the left side of FIGURE 1, detailing the arrangement of parts.
Figure 24:
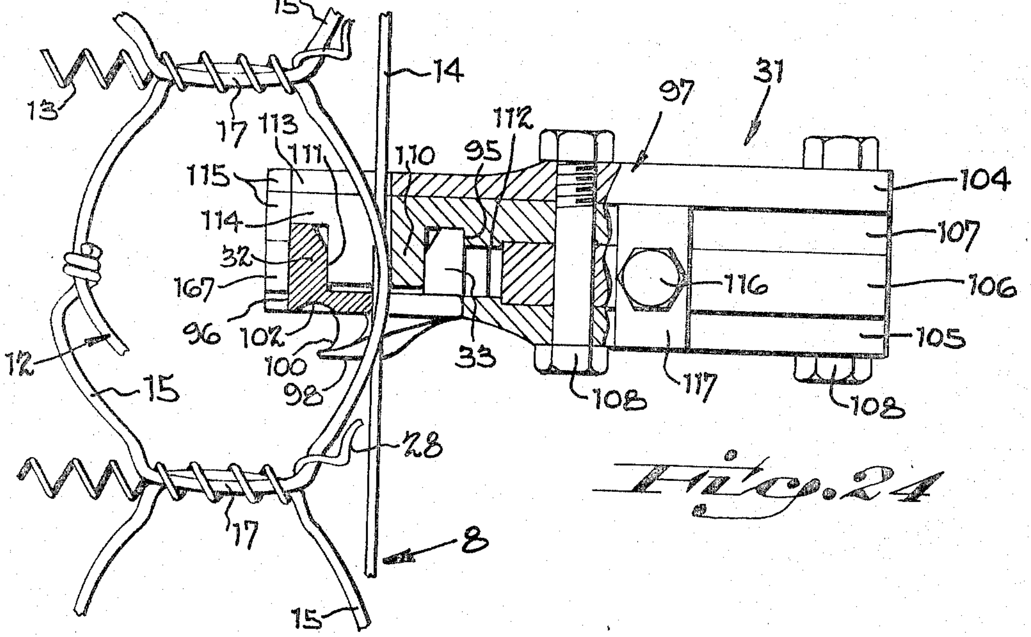
FIGURE 24 is a sectional view similar to FIGURE 23, showing the wrapping gear in rotation during the wrapping cycle.

As viewed in FIGURES 3, 6 and 24, the bearing assembly 97 is mounted upon the bed 3 by means of a bolt 116. Bolt 116 passes through a clamping block 117 which is seated upon the upper edges of the side plates 105 and 107, with the lower end of bolt 116 threaded into the bed 3. Additional locating means, such as dowel pins or the like (not shown) pass from the bed into the bearing assembly to complete the mounting.

Rotary motion is imparted to the wrapping gear 32 during the wrapping cycle by operation of the driving system 38, as explained below.

*Driving and control system*

As noted earlier, the driving system 38 rotates the wrapping gear 32; also, by operation of a pair of cams and associated limit switches, the driving system activates the locating and cut-off cylinder 25 and the stretching cylinder 27 in proper sequence. During normal operation, the gear head motor 37 (FIGURE 2) is energized continuously and the operator controls each cycle by depressing and releasing the treadle, previously indicated at 24. The treadle controls the operation of a conventional single cycle clutch, indicated generally at 118 (FIGURES 1 and 2). Clutch 118 drives the main shaft 120 of the driving system through one complete revolution when the treadle 24 is momentarily depressed and released.

The outer end of the main shaft 120 is provided with a pair of cams 121 and 122 (FIGURES 5 and 6) which control the sequential operation of the cut-off cylinder 25 and stretching cylinder 27. The driving system further includes a Geneva motion, indicated generally at 123 (FIGURES 4–6) which rotates the wrapping gear 32 through its three revolutions after the cams 121 and 122 have energized the locating and cut-off cylinder 25 and the wrapping cylinder 27. In other words, by operation of the Geneva motion 123, the wrapping gear remains stationary for a timed period while cylinders 25 and 27 actuate the cut-off and stretching mechanism; thereafter, the Geneva motion rotates the wrapping gear 32 while the cylinders 25 and 27 remain energized. By this arrangement, locating block 59 and cut-off arm 48 remain in the elevated position (FIGURE 13) to clamp the components of the spring unit firmly in position while the stretching finger 34 remains in its advanced position (FIGURE 17) to confine the trimmed helical end 30 in position to be engaged by the wrapping gear 32.

Figure 16:
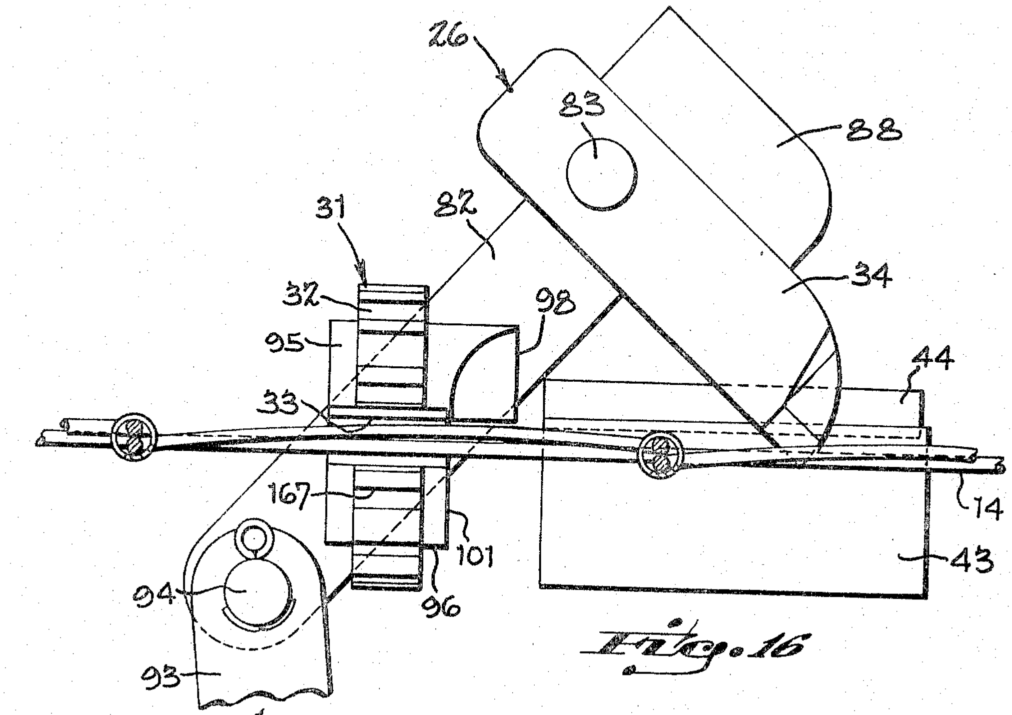
FIGURE 16 is a diagrammatic view similar to FIGURE 15 showing the shiftable locating anvil and cut-off knife in the elevated position at the start of the cycle, thereby to sever the end portion of the helical prior to the helical wrapping operation.

After rotation of the wrapping gear 32, the cams 121 and 122 cause the cylinders 25 and 27 to retract the cut-off arm and stretching finger to the normal position (FIGURES 12 and 16). Immediately thereafter, the single cycle clutch 118 arrests the main shaft 120 so as to stop the wrapping gear in its receiving position, as shown in FIGURE 4. It will be understood, at this point, that the driving system 38 provides a speed increase or step-up ratio between the Geneva motion 123 and wrapping gear 32 so as to rotate the wrapping gear through its three revolutions upon each partial revolution in the Geneva gear 124 (FIGURE 4).

Described in detail (FIGURES 1–6) gear head motor 37 is mounted upon a base 125 which is adjustably secured by screws 126 to the leg structure 2 of the machine frame. The motor shaft 127 includes a small sprocket 128 driving a sprocket chain 130. Chain 130 meshes with a large sprocket 131 which is rotatably mounted on the main shaft 120 of the driving system. The motor drives the large sprocket continuously during operation of the machine in the direction indicated by the arrow (FIGURE 2); however, the large sprocket 131 idles with respect to main shaft 120 until the single cycle clutch 118 is engaged by operation of treadle 24.

The clutch 118 is of conventional design and has not been disclosed in detail. As best shown in FIGURE 1, treadle 24 is pivotally mounted as at 132 to one of the legs 2 of the machine frame and includes a chain 133 having an upper end connected to a clutch release arm 134. Clutch release arm 134 (FIGURES 2 and 3) is pivotally connected as at 135 to the bed 3. The clutch release arm 134 is normally biased downwardly to clutch disengaging position by a tension spring 136 having its opposite ends connected as at 137 and 138 to the leg structure and to the end of the release arm 134.

When the treadle 24 is depressed momentarily, release arm 134 causes engagement of clutch 118, thus coupling the large sprocket 131 to the main shaft 120. Upon completion of one revolution, the clutch 118 uncouples the sprocket from the shaft 120, the cycle being completed at this point.

The main shaft 120 is journalled as at 140—140 (FIGURE 1) in the bed 3 of the machine, the shaft having end portions projecting outwardly beyond the bed 3 at opposite sides. One end portion of the main shaft, as indicated at 141, provides a journal for the large sprocket 131; the opposite end portion 142 projects into the gear train, which is indicated generally at 143. As viewed in FIGURE 1, the gear train is enclosed in a housing indicated at 144.

Described in detail (FIGURES 1–6) gear train 143 is driven intermittently by a Geneva roller 145 which is rotatably journalled upon a stub shaft 146 carried by a driver 147. Driver 147 is keyed to the main shaft 120, as at 148. The driver 147 includes a concentric portion 150 (FIGURE 4) which engages the concave surfaces 151 of the Geneva gear 124 to hold the Geneva gear in stationary position during partial rotation of the driver 147. The Geneva gear is provided with a series of radial slots 152 (in the present example six in number) interposed between the concave surfaces 151. The concentric portion 150 of the driver 147 is cut away as at 153 (FIGURE 6) to provide clearance for the intermittent rotation of the Geneva gear 124. Thus, upon each complete revolution of driver 147, the roller 145 traverses one of the slots 152 to rotate the Geneva gear 124 through one-sixth of a revolution.

The Geneva gear 124 is keyed to a shaft 154 (FIGURES 4 and 6). Shaft 154 has one end mounted in a plate 156 attached to the bed 3 (FIGURES 5 and 6) and an opposite end mounted in a bracket 157. The opposite end of bracket 157 is journalled as at 158 on the end portion 142 of the main shaft 120. In the present example, main shaft 120 includes a brake 155 (FIGURES 4–6) which aids in stopping the shaft at the end of each revolution.

Figure 5:
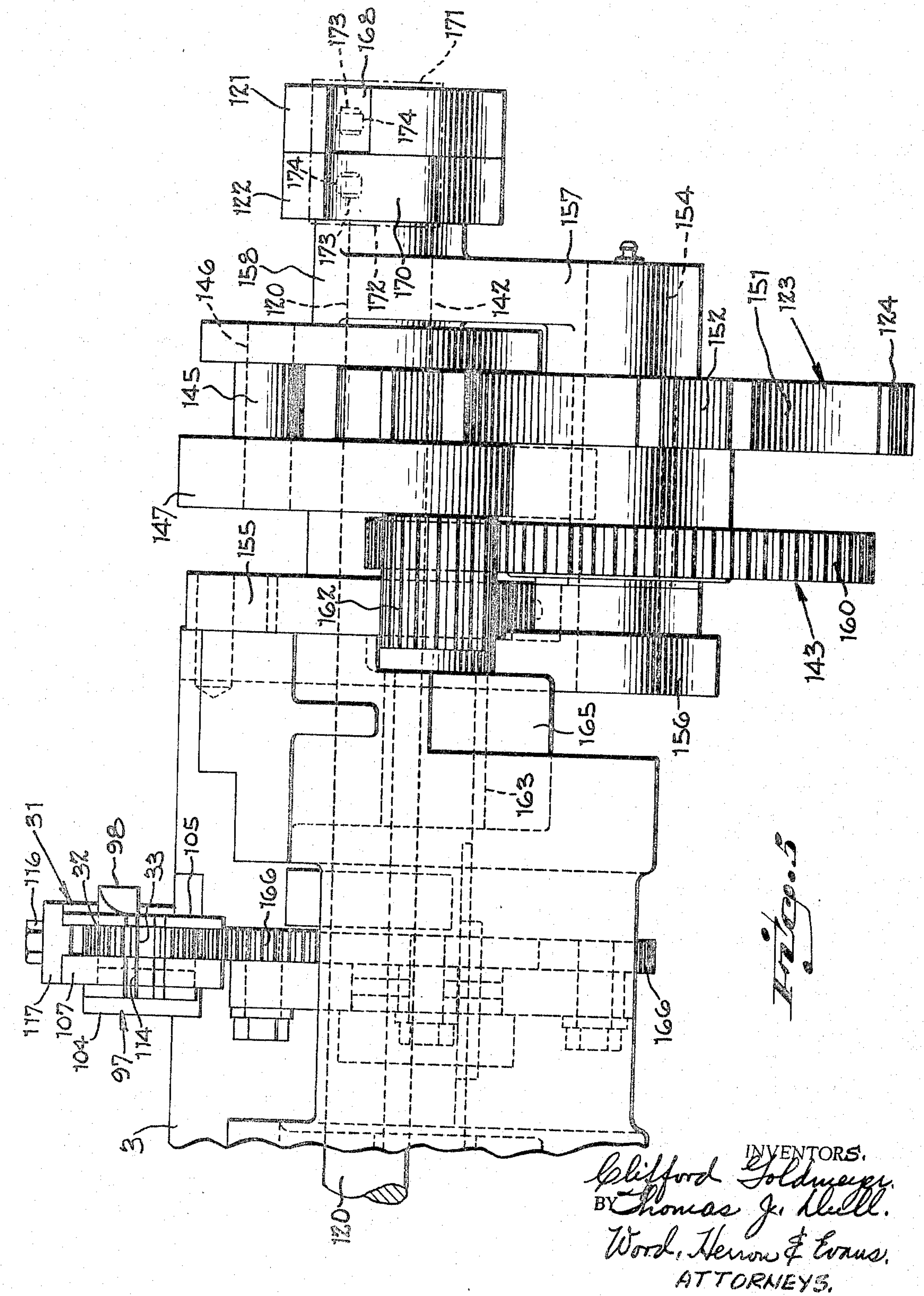
FIGURE 5 is a fragmentary rear elevation, as viewed along the line 5—5 of FIGURE 4, further illustrating the driving system.

A large gear 160 (FIGURE 4) is rotatably journalled on shaft 154 and is keyed as at 161 to the hub of the Geneva gear 124 for intermittent rotation in unison with the Geneva gear 124. Large gear 160 meshes with pinion 162 (FIGURE 4). Pinion 162 is keyed as at 164 to a shaft 163 which is rotatably journalled in a depending portion 165 of the bed 3 (FIGURES 2 and 4). A second large gear 166 is keyed to the shaft 163 in a position displaced laterally from the pinion 162 (FIGURES 4–6). Gear 166 meshes with the teeth 167 of the wrapping gear 32. By this arrangement, each stepwise advancement of the Geneva gear 124 rotates the wrapping gear 32 through three complete turns, the direction of rotation being indicated by the arrows in FIGURE 4.

As noted earlier, the locating and cut-off cylinder 25 and the stretching cylinder 27 are actuated in proper sequence during the rotary motion of the main shaft 120 while the wrapping gear 32 remains stationary by virtue of the dwell period provided by the Geneva motion 123. For this purpose, the cams 121 and 122 each include recessed areas 168 and 170 formed in the periphery of the cam (FIGURE 5). Respective limit switches 171 and 172 as shown in broken lines in FIGURE 5 are located adjacent the respective cams 121 and 122. Each limit switch includes an arm 173, the outer end of which is provided with a roller 174 which tracks upon the periphery of its associated cam 121 or 122. The recessed areas 168 and 170 of the cams are of the proper length and are angularly related to the axis of rotation of the main shaft 120 to energize and deenergize the cut-off cylinder 25 and the stretching cylinder 27 in proper sequence.

The limit switches 171 and 172 are electrically interconnected in a control system and are arranged to operate respective electrically operated air valves. The air valves are of the reversing type and are arranged to supply and exhaust the air pressure with respect to the cylinders 25 and 27 in response to operation of the limit switches 171 and 172 during rotation of the main shaft 120 and cams 121 and 122. The control and air supply system for the cylinders is generally conventional and does not form a part of the present invention; therefore, these components have been omitted from the disclosure. In general, at the start of the cycle (single revolution of main shaft 120) the limit switches energize cylinder 25 to actuate the locating and cut-off mechanisms (arm 48—FIGURES 12 and 13) then to energize cylinder 27 to actuate the stretching finger 34 (FIGURES 16 and 17). The switches hold these components in active position until the driver 147 of the Geneva motion 123 rotates the wrapping gear to complete the operation. Thereafter, the cams act upon the limit switches to reverse the air pressure supply to the cylinders, thereby to retract the locating and cut-off mechanism and the stretching finger at completion of the cycle (FIGURES 12 and 16).

Having described our invention we claim:

1. A helical wrapping machine for completing the assembly of a coil spring unit, said coil spring unit comprising rows of coil springs, a border element, and helicals connecting the rows of coil springs to one another, said helicals each having at least one end portion projecting outwardly beyond said border element, said wrapping machine comprising, a machine frame, a locating mechanism mounted on the machine frame including a shiftable element adapted to locate and clamp mating portions of the border element, coil spring and helical in wrapping position relative to one another, a rotatable wrapping element mounted adjacent said locating mechanism and adapted to receive the end portion of said helical, and means for moving the shiftable element of the locating mechanism into locating and clamping position, and for imparting rotary motion to said wrapping element, said wrapping element adapted to wrap the projecting end portion of said helical about the mating portions of the border element and coil spring, whereby the wrapped end portion of the helical ties the mating portions of the coil spring and border element to one another.

2. A helical wrapping machine as set forth in claim 1 in which the locating mechanism comprises a stationary locating head mounted upon the machine frame and in which the shiftable locating element normally resides in a retracted position below the stationary locating head and includes a plurality of locating elements projecting upwardly, said stationary locating head including a plurality of apertures disposed in registry with the locating elements of the shiftable locating element and adapted to engage, locate and clamp the mating portions of the border wire, coil spring and helical in wrapping position upon motion of the shiftable locating element from said retracted position to an elevated position.

3. A helical wrapping machine as set forth in claim 2 in which the stationary locating element includes a stationary shearing element and in which the shiftable locating element includes a shiftable shearing element coacting with the stationary shearing element, said shearing elements adapted to trim the projecting end portion of the helical during motion of the shiftable locating element from the retracted position to an elevated locating position.

4. A helical wrapping machine as set forth in claim 1 in which the locating mechanism comprises a stationary locating head mounted upon the machine frame and in which the shiftable locating element comprises a swinging arm normally residing in a retracted position below the stationary locating head and having one end pivotally connected to the machine frame, said swinging arm including a plurality of locating elements projecting upwardly from said swinging arm, said stationary locating head including a plurality of apertures disposed in registry with the locating elements of the swinging arm and adapted to engage, locate and clamp the mating portions of the border wire, coil spring and helical in wrapping position upon motion of the swinging arm from said retracted position to an elevated position.

5. A helical wrapping machine as set forth in claim 4 in which the stationary locating head includes a first shearing element projecting downwardly below the surface of the stationary locating head and in which the swinging arm includes a second shearing element projecting upwardly from the swinging arm and coacting with the first shearing element, said shearing elements adapted to trim the projecting end portion of the helical as an incident of the upward motion of the arm to the clamping position.

6. A helical wrapping machine for completing the assembly of a coil spring unit, said coil spring unit comprising rows of coil springs, a border element, and helicals connecting the rows of coil springs to one another, said helicals each having at least one end portion projecting outwardly beyond said border element, said wrapping machine comprising, a machine frame, a locating mechanism mounted on the machine frame including a shiftable element adapted to locate and clamp mating portions of the border element, coil spring and helical in wrapping position relative to one another, a stretching element adapted to engage and stretch the projecting end portion of the helical and to shift the same laterally in a direction generally parallel to the border element, a rotatable wrapping element mounted adjacent said locating mechanism and adapted to receive the end portion of said stretched helical, and actuating means for moving the shiftable element of the locating mechanism into locating and clamping position, actuating means for shifting said stretching element laterally, and actuating means for imparting rotary motion to said wrapping element, said wrapping element adapted to wrap the end portion of said stretched helical about the mating portions of the border element and coil spring, whereby the wrapped end portion of the helical ties the mating portions of the coil spring and border element to one another.

7. A wrapping machine as set forth in claim 6 in which the stretching element comprises a stretching finger having one end pivotally connected to the machine frame and normally residing in a retracted position, and in which the actuating means pivots the stretching finger from the retracted position to the advanced position after the actuating means has shifted the locating mechanism into clamping position, said stretching finger adapted to engage and stretch the end portion of the helical laterally to a position to be engaged by the said wrapping element.

8. A helical wrapping machine as set forth in claim 7 in which the means for rotating the wrapping gear comprises a driving system having a Geneva motion and a gear train connecting the Geneva motion to said rotatable wrapping element, said Geneva motion adapted to be advanced intermittently through a partial revolution by said driving system, said gear train providing a step-up ratio, whereby the partial revolution of the Geneva motion imparts a plurality of complete revolutions to the rotary wrapping gear.

9. A driving system as set forth in claim 8 in which the driving system includes a motor, a main drive shaft, a single cycle clutch connecting the motor to the main drive shaft, and clutch engaging means, whereby said clutch is adapted to impart a single revolution to said main shaft upon actuation of said clutch actuating means, said main shaft including a Geneva driver, and a Geneva gear adapted to be advanced intermittently by said driver, thereby to impart rotary motion to the wrapping gear.

10. A helical wrapping machine as set forth in claim 9 in which said main drive shaft includes respective cams, said cams adapted to energize said actuating means in sequence with one another to shift the locating mechanism into locating and clamping position, to shift the stretching element laterally to stretching position, and in which the Geneva motion provides a dwell period while said sequential operations are carried out.

11. A helical wrapping machine as set forth in claim 6 in which the rotatable wrapping element comprises a gear, said gear including a radial slot extending from the periphery to the axis of rotation of the gear, said slot adapted to receive the mating portions of the border wire and coil spring and adapted to wrap the stretched end portion of the helical about said mating portions of the border wire and coil spring during rotation of the gear.

12. A wrapping machine as set forth in claim 6 in which the rotatable wrapping element comprises a gear, said gear including a radial slot extending from the periphery to the axis of rotation of the gear, said slot adapted to receive the mating portions of the border wire and coil spring, said gear including means adapted to engage the stretched end portion of the helical and to wrap the same about said mating portions of the border wire and coil spring during rotation of the gear through a plurality of turns, said means for imparting rotary motion to the gear being adapted to stop the rotary motion of the gear with said slot disposed in a plane adapted to receive the border wire and mating portion of the coil spring.

13. A helical wrapping machine as set forth in claim 12 in which the wrapping gear is provided with a face adapted to receive the stretched end portion of the helical, said face including helical engaging means projecting outwardly therefrom adapted to confine the end portion of the stretched helical, said stretching element being adapted to confine the stretched end portion of the helical in said helical engaging means during rotary motion of the wrapping gear, whereby the said end portion of the helical is rotated in an orbit about the mating portions of the border wire and coil spring to wrap the end portion of the helical about said mating portions during rotation of the wrapping gear.

14. A helical wrapping machine as set forth in claim 6 in which the rotatable wrapping element is provided with a face adapted to receive the stretched end portion of the helical, said face including a lug projecting outwardly therefrom, said lug including a recess adapted to confine the end portion of the stretched helical, said stretching element being adapted to bend an end portion of the stretched helical to a plane generally parallel to the face of the wrapping element and at right angles to the border wire, said stretching element being adapted to confine said bent end portion of the stretched helical in said recess during rotary motion of the wrapping element, whereby the said end portion of the helical is rotated in an orbit about the mating portions of the border wire and coil spring to wrap the end portion of the helical about said mating portions.

15. A helical wrapping machine for completing the assembly of a coil spring unit, said coil spring unit comprising rows of coil springs, a border wire, and helicals connecting the rows of coil springs to one another, said helicals each having at least one end portion projecting outwardly beyond said border wire, said wrapping machine comprising, a machine frame, a stationary locating element mounted on the machine frame, a shiftable locating element mounted beneath said stationary locating element, said stationary and shiftable locating elements adapted to locate and clamp mating portions of the border wire, coil spring, and helical in wrapping position relative to one another, a stretching element adapted to engage and stretch the projecting end portion of the helical after the border wire, coil springs and helical are located and clamped by the stationary and shiftable locating elements, a rotatable wrapping element mounted adjacent said stationary and shiftable locating elements and adapted to receive the end portion of said stretched helical, means for moving the said shiftable locating element toward the stationary element, thereby to locate and clamp the mating portions of the border wire, coil spring and helical in a wrapping position, means for shifting said stretching element to a stretch-position adjacent the rotatable wrapping element, and means for imparting rotary motion to the wrapping element, said wrapping element adapted to wrap the end portion of said stretched helical about the mating portions of the border wire and coil spring, whereby the end portion of the helical ties the mating portions of the coil spring and border wire to one another.

16. A helical wrapping machine for completing the assembly of a coil spring unit, said coil spring unit comprising rows of coil springs, a border wire, and helicals connecting the rows of coil springs to one another, said helicals each having at least one end portion projecting outwardly beyond said border wire, said wrapping machine comprising, a machine frame, a stationary locating element mounted on the machine frame, a normally retracted shiftable locating element mounted beneath said stationary locating element, a table mounted adjacent the stationary and shiftable locating elements adapted to support the coil spring unit in operating position relative to the stationary and shiftable locating elements, said stationary and shiftable locating elements adapted to locate and clamp mating portions of the border wire, coil springs, and helical supported by said table in wrapping position relative to one another, a normally retracted stretching element adapted to engage and stretch the projecting end portion of the helical after the border wire, coil springs and helical are located and clamped by the stationary and shiftable locating elements, a rotatable wrapping element mounted adjacent said stationary and shiftable locating elements and adapted to receive the end portion of said stretched helical, said stretching element being shiftable from said retracted position to an advanced position along a path generally parallel to said border wire and adapted to reside in a position adjacent said wrapping element in said advanced position, thereby to confine the end portion of the stretched helical in said rotatable wrapping element, means for moving the shiftable element of the locating mechanism from said retracted position to an advanced position adjacent the stationary locating element, thereby to locate and clamp the adjacent portions of the border wire, coil springs and helical in a wrapping position, means for shifting said stretching element from said retracted position to the advanced position adjacent the rotatable wrapping element, and means for imparting rotary motion to the wrapping element, said wrapping element adapted to wrap the end portion of said stretched helical about the mating portions of the border wire and coil spring, whereby the end portion of the helical ties the adjacent portions of the coil spring and border wire to one another.

17. A helical wrapping machine for completing the assembly of a coil spring unit, said coil spring unit comprising rows of coil springs, a border element, and helicals connecting the rows of coil springs to one another, said helicals each having at least one end portion projecting outwardly beyond said border element, said wrapping machine comprising, a machine frame, a stationary locating element mounted on the machine frame, a normally retracted shiftable locating element mounted beneath said stationary locating element and adapted to be shifted upwardly, a stationary shearing element mounted upon the stationary locating element, a shiftable shearing element mounted upon the shiftable locating element for movement therewith, said shiftable shearing element coacting with said stationary shearing element and adapted to trim the projecting end portion of said helical to a predetermined length upon upward motion of the shiftable locating element from said retracted position, said shiftable locating element adapted to locate and clamp mating portions of the border element, coil spring and helical in wrapping position relative to one another concurrently with said trimming operation upon upward motion of said shiftable locating element, a rotatable wrapping element mounted adjacent said stationary and shiftable locating elements and adapted to receive the end portion of said trimmed helical, means for moving the shiftable element of the locating mechanism from said retracted position to an advanced position adjacent the stationary locating element, and means for imparting rotary motion to the wrapping element, said wrapping element adapted to wrap the end portion of said trimmed helical about the mating portions of the border wire and coil spring, whereby the end portion of the helical ties the adjacent portions of the coil spring and border wire to one another.

18. A helical wrapping machine for completing the assembly of a coil spring unit, said coil spring unit comprising rows of coil springs, a border wire, and helicals connecting the rows of coil springs to one another, said helicals each having at least one end portion projecting outwardly beyond said border wire, said wrapping machine comprising, a machine frame, a stationary locating element mounted on the machine frame, a normally retracted shiftable locating element mounted beneath said stationary locating element, said stationary and shiftable locating elements coacting to locate and clamp mating portions of the border wire, coil spring, and helical in wrapping position relative to one another, a normally retracted stretching element adapted to engage and stretch the projecting end portion of the helical after the border wire, coil springs and helical are located and clamped by the stationary and shiftable locating elements, a rotatable wrapping element mounted adjacent said stationary and shiftable locating elements and adapted to receive the end portion of said stretched helical, a first power element for moving the shiftable element of the locating mechanism from the retracted position toward the stationary locating element, thereby to locate and clamp the mating portions of the border wire, coil spring and helical in a wrapping position, a second power element for shifting said stretching element from the retracted position to a stretching position adjacent the rotatable wrapping element, a power motor, and a driving system connecting the power motor to said wrapping element and adapted to rotate the same through a predetermined number of complete revolutions, said wrapping element adapted to wrap the end portion of said stretched helical about the mating portions of the border wire and coil spring, whereby the end portion of the helical ties the mating portions of the coil spring and border wire to one another.

References Cited by the Examiner

UNITED STATES PATENTS

| | | | |
|---|---|---|---|
| 2,161,689 | 6/1939 | Strandberg | 140—92.3 |
| 2,925,099 | 2/1960 | Bergstrom | 140—92.7 |
| 3,122,177 | 2/1964 | Kamp | 140—92.7 |
| 3,182,689 | 5/1965 | Hulme et al. | 140—92.3 |

CHARLES W. LANHAM, *Primary Examiner.*

RONALD D. GREFE, *Assistant Examiner.*